(12) United States Patent
Muylem et al.

(10) Patent No.: US 7,202,296 B2
(45) Date of Patent: Apr. 10, 2007

(54) FLAME RETARDANT COMPOSITIONS AND THEIR USE

(75) Inventors: Luc Van Muylem, Baton Rouge, LA (US); Samuel G. Thomas, Jr., Baton Rouge, LA (US); Susan D. Landry, Baton Rouge, LA (US); Douglas W. Luther, Walker, LA (US)

(73) Assignee: Albemarle Corporation, Richmond, VA (US)

( * ) Notice: Subject to any disclaimer, the term of this patent is extended or adjusted under 35 U.S.C. 154(b) by 404 days.

(21) Appl. No.: 10/742,289

(22) Filed: Dec. 19, 2003

(65) Prior Publication Data

US 2005/0137311 A1 Jun. 23, 2005

(51) Int. Cl.
*C08K 5/03* (2006.01)

(52) U.S. Cl. .................. 524/469; 524/464; 524/465; 524/466

(58) Field of Classification Search ........ 524/464–466, 524/469
See application file for complete search history.

(56) References Cited

U.S. PATENT DOCUMENTS

| 4,879,353 | A | | 11/1989 | Sanders et al. | |
|---|---|---|---|---|---|
| 5,369,202 | A | * | 11/1994 | Atwell et al. | 526/293 |
| 6,518,468 | B1 | | 2/2003 | Parks et al. | |
| 6,521,714 | B2 | | 2/2003 | Kolich et al. | |
| 6,569,912 | B1 | * | 5/2003 | Oohara et al. | 521/79 |
| 2004/0072929 | A1 | * | 4/2004 | De Schryver | 524/86 |

FOREIGN PATENT DOCUMENTS

| EP | 0201411 A2 | 11/1986 |
|---|---|---|
| EP | 0 946 632 B1 | 6/2001 |
| IL | 108960 | 8/1998 |
| JP | 59-102903 | 6/1984 |
| JP | 02-215807 | 8/1990 |
| JP | 04-337343 | 11/1992 |
| JP | 05-239326 | 9/1993 |
| JP | 06-128423 | 5/1994 |
| JP | 06-128423 | 10/1994 |
| JP | 06-322022 | 11/1994 |
| JP | 06-322023 | 11/1994 |
| JP | 07-018165 | 1/1995 |
| JP | 07-126320 | 5/1995 |
| JP | 07-126463 | 5/1995 |
| JP | 08-073684 | 3/1996 |
| JP | 08-188622 | 7/1996 |
| JP | 09-221574 | 6/1997 |
| JP | 09-227625 | 9/1997 |
| JP | 10-158327 | 6/1998 |
| JP | 11-043511 | 2/1999 |
| JP | 2000-248018 | 9/2000 |
| JP | 2000-281800 | 10/2000 |
| JP | 2002-348430 | 12/2002 |
| WO | WO 03/046071 A1 | 6/2003 |

OTHER PUBLICATIONS

CAPLUS Abstract of Myzak, Edward A., Jr., et al., "New Generation of Inorganic Colloids for Flame Retardancy and UV Stabilization of Polymers", Recent Advances in flame Retardancy of Polymeric Materials, 1997, Vol Date 1996, 7, 145-155, 1 page.
1 page SAYTEX HP-3010 product brochure from Albermarle Corporation, 2003.
De Schryver, D., et al., "Latest developments on the flame retardancy of engineering thermoplastics—SAYTEX® HP-7010 (brominated polystyrene) in glass filled engineering thermoplastics", Polymer Degradation and Stability, 64, pp. 471-477.
US 5,695,691, 12/1997, McLaughlin et al. (withdrawn)

* cited by examiner

*Primary Examiner*—Peter Szekely

(57) ABSTRACT

Disclosed are flame retardant compositions comprised of (a) brominated anionic styrenic polymer, and (b) at least one polybrominated alpha-omega diphenylalkane having a total of at least 6 bromine atoms directly bonded to the phenyl rings and in the range of 1 to 6 carbon atoms in the alkylene group disposed between the phenyl groups, and specified flame retarded polymer compositions with which have been blended (a) and (b) individually or in combination.

13 Claims, 15 Drawing Sheets

Blends vs Viscosity; Table 1

Blends vs Viscosity; Table 2

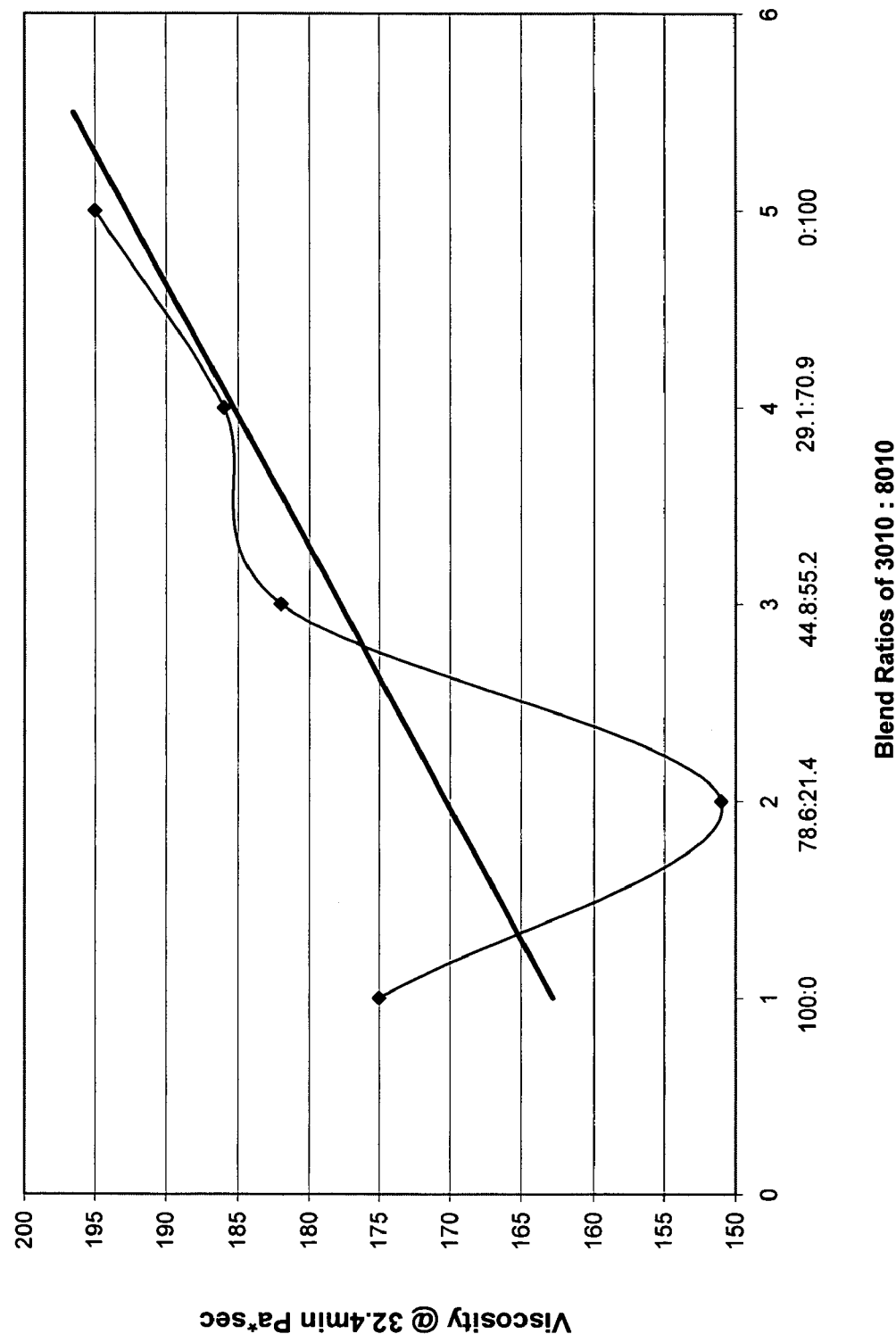

Blends vs Viscosity; Table 3

Blends vs Viscosity; Table 3

Blends vs Viscosity; Table 3

FLAME RETARDANT COMPOSITIONS AND THEIR USE

TECHNICAL FIELD

This invention relates to new, highly effective flame retardant compositions and thermoplastic polymers that are effectively flame retarded by inclusion therein of a flame retardant composition of this invention.

BRIEF SUMMARY OF THE INVENTION

Pursuant to this invention it has been discovered that certain combinations of flame retardants are not only highly effective as flame retardants but that, in addition, can provide desirable physical properties to thermoplastic polymers such as styrenic polymers.

The flame retardant compositions of this invention are comprised of (a) brominated anionic styrenic polymer, and (b) at least one poly-ar-brominated diphenylalkane. In the practice of this invention other additive components which do not materially detract from the performance of such flame retardant compositions can be used in conjunction with such compositions.

The styrenic polymer reactant used in the production of the brominated anionic styrenic polymer used as component (a) in the practice of this invention are produced by anionically-initiated polymerization. Such brominated anionic styrenic polymers when used in conjunction with at least one component (b) compound enable the achievement of the advantageous results achievable pursuant to this invention.

In the most preferred embodiments of this invention (a) is brominated anionic polystyrene and (b) is a commercially-available decabromodiphenylethane product.

BRIEF DESCRIPTION OF THE DRAWINGS

FIGS. 2A–2E are computer generated regression plots of the capillary rheometry viscosity data of the composition of Example 2 at 250° C. in Pascal-seconds taken at 6.5, 13, 19.5, 25.9, and 32.4 minutes, respectively, as given in Table 2.

Figure 1A:
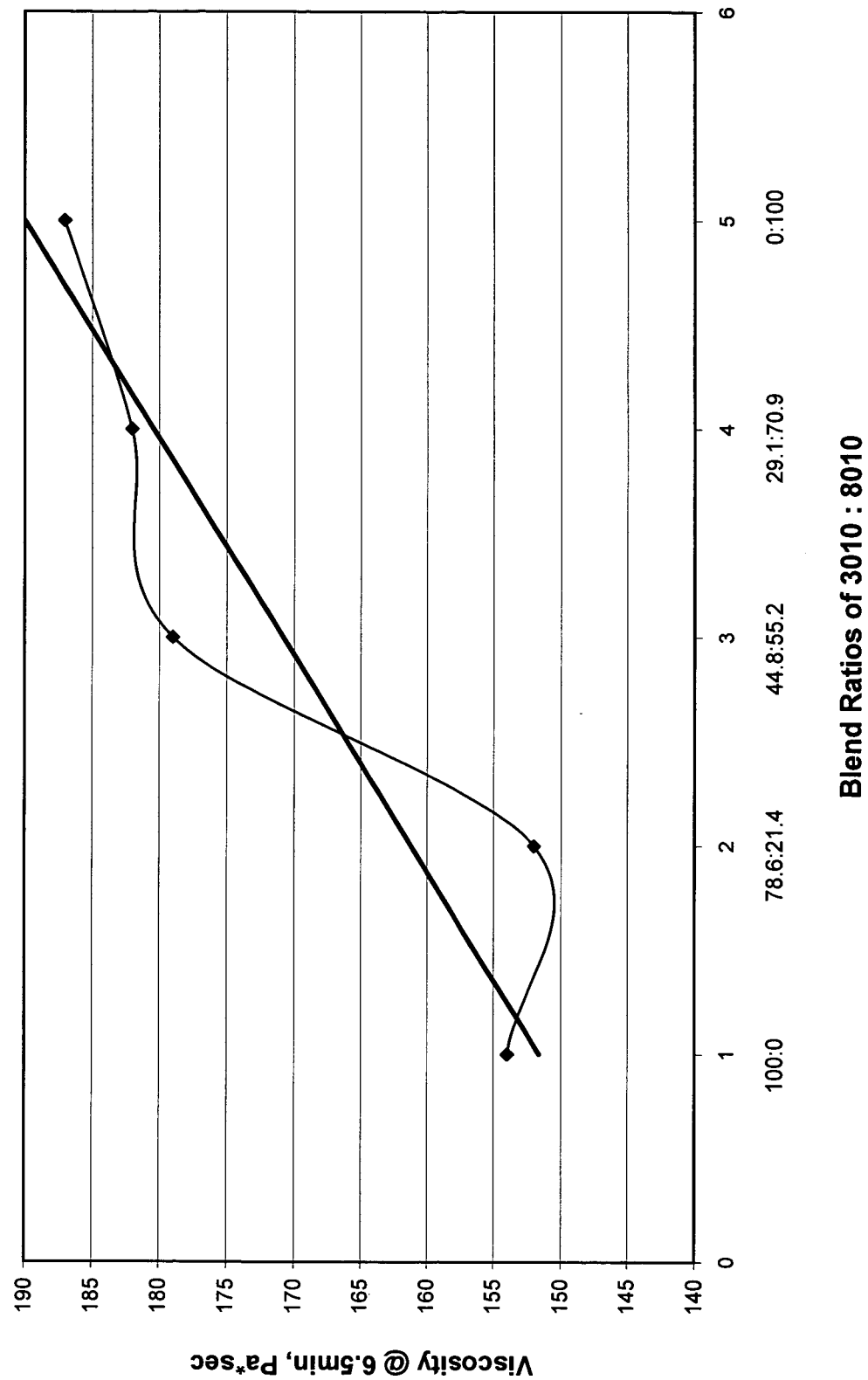
FIGS. 1A–1E are computer generated regression plots of the capillary rheometry viscosity data of the composition of Example 1 at 250° C. in Pascal-seconds taken at 6.5, 13, 19.5, 25.9, and 32.4 minutes, respectively, set forth in Table 1.

In each Figure the curved line denotes test data as set out in the Table referenced in the title of the respective Figure. The straight line incorporated into each Figure represents a linear trendline calculated by the graphical software program on the basis of the least squares fit for a line as applied to the data points of the test data submitted for the particular figure.

FURTHER DETAILED DESCRIPTION OF THE INVENTION

Component (a)

Component (a) of the compositions of this invention is at least one brominated anionic styrenic polymer, i.e., component (a) is (i) at least one anionically-produced styrenic homopolymer that has been brominated or (ii) at least one anionically-produced copolymer of two or more styrenic monomers that has been brominated, or (iii) both of (i) and (ii). The bromine content of such polymer should be at least about 50 percent by weight. Preferred brominated anionic styrenic polymers, especially brominated anionic polystyrene, have a bromine content of at least about 60 wt %, and more preferred brominated anionic styrenic polymers, especially brominated anionic polystyrene, have a bromine content of at least about 64 wt %. Particularly preferred brominated anionic styrenic polymers, especially brominated anionic polystyrene, have a bromine content in the range of about 67 to about 69 wt %. The bromine content of brominated styrenic polymers such as brominated polystyrene will seldom exceed about 71 wt %. Typically the brominated anionic styrenic polymer will have a melt flow index by the ASTM D1238-99 test procedure, conducted at 220° C. and 2.16 kg, in the range of about 3 to about 40, and preferably such melt flow index is in the range of about 5 to about 35. Most preferred brominated anionic styrenic polymers used in the practice of this invention have a melt flow index under these test conditions in the range of about 6 to about 30. In this connection, component (a) substances may not "melt" in the sense of reaching a melting point temperature at which they suddenly become transformed from a solid to a liquid. Rather, they tend to be amorphous substances which, when heated, tend to progressively soften as temperature is increased and thus become progressively more pliable and tend to take on characteristics of a liquid such that other substances can be dispersed therewith by use of conventional mixing or blending procedures.

Anionic styrenic polymers which are brominated to form the brominated anionic styrenic polymers used pursuant to this invention are one or more anionic homopolymers and/or anionic copolymers of at least one vinyl aromatic monomer. Preferred vinyl aromatic monomers have the formula:

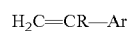

$$H_2C=CR-Ar$$

wherein R is a hydrogen atom or an alkyl group having from 1 to 4 carbon atoms and Ar is an aromatic group (including alkyl-ring substituted aromatic groups) of from 6 to 10 carbon atoms. Examples of such monomers are styrene, alpha-methylstyrene, ortho-methylstyrene, meta-methylstyrene, para-methylstyrene, para-ethylstyrene, isopropenyltoluene, vinylnaphthalene, isopropenylnaphthalene, vinylbiphenyl, vinylanthracene, the dimethylstyrenes, and tert-butylstyrene. Polystyrene is the preferred reactant. When the brominated styrenic polymer is made by bromination of an anionic copolymer of two or more vinyl aromatic monomers, it is preferred that styrene be one of the monomers and that styrene comprise at least 50 weight percent and preferably at least about 80 weight percent of the copolymerizable vinyl aromatic monomers. It is to be noted that the terms "brominated anionic styrenic polymer" and "brominated anionic polystyrene" as used herein refer to a brominated anionic polymer produced by bromination of a pre-existing anionic styrenic polymer such as anionic polystyrene or an anionic copolymer of styrene and at least one other vinyl aromatic monomer, as distinguished from an oligomer or polymer produced by oligomerization or polymerization of one or more brominated styrenic monomers, the properties of the latter oligomers or polymers being considerably different from brominated anionic polystyrene in a number of respects. Also, the terms "vinylaromatic" and "styrenic" in connection with monomer(s) or polymer(s) are used interchangeably herein.

The aromatic pendant constituents of the anionic styrenic polymer can be alkyl substituted or substituted by bromine or chlorine atoms, but in most cases, will not be so substituted. Typically, the anionic styrenic polymers used to produce the brominated anionic styrenic polymers used in the practice of this invention will have a weight average molecular weight ($M_w$) in the range of about 2000 to about 50,000 and a polydispersity in the range of 1 to about 10. Preferred brominated anionic styrenic polymers used in the practice of this invention are produced from anionic styrenic polymers having a weight average molecular weight ($M_w$) in the range of about 3000 to about 10,000 and a polydispersity in the range of 1 to about 4, and most preferably these ranges are, respectively, about 3500 to about 4500 and 1 to about 4. The $M_w$ and polydispersity values are both based on gel permeation chromatography (GPC) techniques which are hereinafter described.

Methods for the preparation of anionic styrenic polymers such as anionic polystyrene are known in the art and reported in the literature. See for example, U.S. Pat. Nos. 3,812,088; 4,200,713; 4,442,273; 4,883,846; 5,391,655; 5,717,040; and 5,902,865; the disclosures of which are incorporated herein by reference. An especially preferred method is described in commonly-owned copending application Ser. No.10/211,648, filed Aug. 1,2002, the disclosure of which method is incorporated herein by reference.

Bromination processes which can be used for producing a brominated anionic styrenic polymer are disclosed in U.S. Pat. Nos. 5,677,390; 5,686,538; 5,767,203; 5,852,131; 5,916,978; and 6,207,765 which disclosures are incorporated herein by reference.

Brominated anionic polystyrene is available in the marketplace from Albemarle Corporation under the designation SAYTEX® HP 3010. Current typical properties of this product include the following:

Appearance/form—off-white granules
Tg(° C.)—162
Specific gravity (@23° C.)—2.22
Bulk Density, lb/gal (kg/m$^3$)—12.2
TGA (TA instruments model 2950, 10° C./min. under N$_2$):
 1% weight loss, ° C.—342
 5% weight loss, ° C.—360
 10% weight loss, ° C.—368
 50% weight loss, ° C.—393
 90% weight loss, ° C.—423

Normally one can rely upon the specifications of a reputable manufacturer as regards chemical analysis and properties of an anionic styrenic polymer or a brominated anionic styrenic polymer. If deemed necessary or desirable, any reliable analytical procedure such as reported in the literature can be employed in determining such analysis or properties. In any doubtful or disputed case, the following procedures are recommended:

1) Bromine Content—Since brominated anionic styrenic polymers have good, or at least satisfactory, solubility in solvents such as tetrahydrofuran (THF), the determination of the total bromine content for a brominated anionic styrenic polymer is easily accomplished by using conventional X-Ray Fluorescence techniques. The sample analyzed is a dilute sample, say 0.1±0.05 g brominated anionic polystyrene in 60 mL THF. The XRF spectrometer can be a Phillips PW1480 Spectrometer. A standardized solution of bromobenzene in THF is used as the calibration standard.

2) Melt Flow Index—To determine the melt flow index of a brominated styrenic polymer, the procedure and test equipment of ASTM Test Method D1238-99 are used. The extrusion plastometer is operated at 270° C. and 2.16 kg applied pressure. The samples used in the tests are composed of 50 parts by weight of antimony oxide, a calculated quantity in the range of about 200 to about 250 parts by weight of the brominated anionic styrenic polymer that will provide a final blend containing 15.0 wt % Br based on the Br content of the brominated anionic styrenic polymer, and sufficient glass-filled nylon 6,6 (Zytel polymer, from DuPont) to give a total of 1000 parts by weight.

3) Weight Average Molecular Weight and Polydispersity—$M_w$ values of anionic styrenic polymers are obtained by GPC using a Waters model 510 HPLC pump and, as detectors, a Waters Refractive Index Detector, Model 410 and a Precision Detector Light Scattering Detector, Model PD2000, or equivalent equipment. The columns are Waters, μStyragel, 500 Å, 10,000 Å and 100,000 Å. The autosampler is a Shimadzu, Model Sil 9A. A polystyrene standard ($M_w$=185,000) is routinely used to verify the accuracy of the light scattering data. The solvent used is tetrahydrofuran, HPLC grade. The test procedure used entails dissolving 0.015–0.020 g of sample in 10 mL of THF. An aliquot of this solution is filtered and 50 μL is injected on the columns. The separation is analyzed using software provided by Precision Detectors for the PD 2000 Light Scattering Detector. The instrument provides results in terms of weight average molecular weight and also in terms of number average molecular weight. Thus, to obtain a value for polydispersity, the value for weight average molecular weight is divided by the value for number average molecular weight.

Component (b)

Various polybrominated diphenylalkanes can be used as component (b). Typically these compounds will be an alpha-omega diphenylalkane having (i) a linear (i.e., unbranched) alkylene group of 1 to 6 carbon atoms disposed between the two phenyl groups and (ii) a total of at least 6 bromine atoms directly bonded to the phenyl rings; or a mixture of two or more such compounds. Preferred is an alpha-omega diphenylalkane having (i) a linear (i.e., unbranched) alkylene group of 1 to 4 carbon atoms disposed between the two phenyl groups and (ii) a total of at least 8 bromine atoms directly bonded to the phenyl rings; or a mixture of two or more such compounds. More preferred is an alpha-omega diphenylalkane having (i) a linear (i.e., unbranched) alkylene group or 1 or 2 carbon atoms disposed between the two phenyl groups and (ii) a total of at least 9 bromine atoms directly bonded to the phenyl rings; or a mixture of two or more such compounds. Most preferred is decabromodiphenylethane. It will be appreciated that the alkylene groups having, for example, 1 to 6 carbon atoms are methylene ($-CH_2-$), ethylene ($-CH_2CH_2-$), propylene ($-CH_2CH_2CH_2-$), butylene ($-CH_2CH_2CH_2CH_2-$), pentylene ($-CH_2CH_2CH_2CH_2CH_2-$), and/or hexylene ($-CH_2CH_2CH_2CH_2CH_2CH_2-$). In each case, the linear alkylene bridge between the bromophenyl groups may also have some bromine substitution thereon, but preferably the alkylene group is essentially free or totally free of halogen substitution.

Thus the polybromodiphenylalkanes are one or more compounds which can be represented by the formula

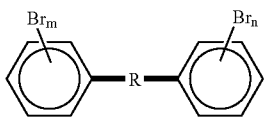

wherein R is a linear alkylene group of 1 to 6 carbon atoms in length, which may be partially or fully brominated, but which preferably is substantially free of bromine substitution; m is 1 to 5; and n is 1 to 5 with the sum of m plus n equal to at least 6. Preferably R has 1 to 4 carbon atoms and most preferably 2 carbon atoms. The total of m plus n is preferably at least 8, more preferably in the range of 9 to 10, and most preferably is 10.

Non-limiting examples of alpha-omega polybromodiphenylalkanes which may be used as component (b) include hexabromodiphenylmethane, heptabromodiphenylmethane, octabromodiphenylmethane, nonabromodiphenylmethane, decabromodiphenylmethane, hexabromodiphenylethane, heptabromodiphenylethane, octabromodiphenylethane, nonabromodiphenylethane, decabromodiphenylethane, hexabromodiphenylpropane, heptabromodiphenylpropane, octabromodiphenylpropane, nonabromodiphenylpropane, decabromodiphenylpropane, hexabromodiphenylbutane, heptabromodiphenylbutane, octabromodiphenylbutane, nonabromodiphenylbutane, decabromodiphenylbutane, hexabromodiphenylpentane, heptabromodiphenylpentane, octabromodiphenylpentane, nonabromodiphenylpentane, decabromodiphenylpentane, hexabromodiphenylhexane, heptabromodiphenylhexane, octabromodiphenylhexane, nonabromodiphenylhexane, decabromodiphenylhexane, octabromodiphenyl-1-bromoethane, nonabromodiphenyl-1,2-dibromoethane, decabromodiphenyl-1-bromoethane, decabromodiphenyl-1,2-dibromoethane, and analogous compounds. Mixtures of two or more such compounds can also be used as component (b). Most preferred is 1,2-bis(pentabromophenyl)ethane, which is commonly known in the art as decabromodiphenylethane.

In the above exemplifications of alpha-omega polybromodiphenylalkanes a simplified method of nomenclature is used. To illustrate, hexabromodiphenylmethane can be a single compound or a mixture of compounds. The designation "hexabromodiphenylmethane" represents diphenylmethane having a total of 6 bromine atoms on the phenyl groups. Thus if the hexabromodiphenylmethane a single compound, (a) 3 bromine atoms can be on each of the two phenyl groups, (b) 4 bromine atoms can be on one of the phenyl groups and 2 bromine atoms can be on the other phenyl group, or (c) 5 bromine atoms can be on one of the phenyl groups and 1 bromine atom can be on the other phenyl group. If the hexabromodiphenylmethane is a mixture, it will comprise 2 or all 3 of compounds (a), (b), and (c) with the average number of bromine atoms per molecule being about 6. The same type of considerations apply to most of the other alpha-omega polybromodiphenylalkanes referred to herein. For example, the designation "octabromodiphenylethane" represents 1,2-diphenylethane having a total of 8 bromine atoms suitably distributed on the phenyl groups. Nomenclature used in Chemical Abstracts refers to this compound as the octobromo derivative of 1,1'-(1,2-ethanediyl)bisbenzene, and notes that another name for this is octabromodiphenylethane. The Registry No. given for this substance is 137563-34-9. In the case of a compound in which each of the phenyl groups is substituted by 5 bromine atoms—e.g., decabromodiphenylethane—nomenclature used in Chemical Abstracts refers to such a compound as 1,1'-(1,2-ethanediyl)bis(2,3,4,5,6-pentabromobenzene), and also indicates that among other names for this type of compound is decabromodiphenylethane. The Registry No. given for this substance is 84852-53-9.

Methods for preparing alpha-omega polybromodiphenylalkanes are reported in the literature. See for example the methods disclosed in U.S. Pat. Nos. 5,003,117; 5,008,477; 5,030,778, 5,077,334; and 6,518,468; the disclosures of which methods are incorporated herein by reference.

Proportions of Components (a) and (b)

The proportions between components (a) and (b) can be varied and in all cases effective flame retardancy will be obtained with any and all proportions thereof as long as the total amount of these two components present in the substrate or host polymer is a flame retardant amount as described below. As the proportion of component (a) relative to component (b) is progressively increased from an (a):(b) weight ratio of about 1:99 to about 99.9:0.1 (preferably in the range of about 10:90 to about 90:10), component (a) can, in addition to serving as a flame retardant, progress from being a binder for (b) to being a host polymer in which component (b) is widely dispersed.

Substrate Polymers

Other embodiments of this invention are compositions comprising a polymer comprised of one or more polymerized monomers having a polymerizable olefinic double bond in the molecule with which has been blended a flame retardant quantity of a flame retardant additive composition of the above components (a) and (b). There are three groups of such polymers, namely (i) one or more vinylaromatic homopolymers or copolymers, preferably high-impact polystyrene, (ii) one or more acyclic olefinic hydrocarbon homopolymers or copolymers, such as polyethylene, polypropylene, and copolymers of ethylene or propylene with at least one higher olefin and with or without a diene monomer, and (iii) one or more copolymers of at least one vinylaromatic monomer and at least one non-vinylaromatic monomer containing a functional group, such as acrylonitrile, an acrylate monomer, or a methacrylate monomer with or without a diene monomer. Examples of group (ii) include ABS, MBS, SAN, and ASA. In formulating such blends, components (a) and (b) can be blended with the polymer individually and/or in any sub-combination(s) or partial blend(s) of components (a) and (b) and any other selected optional additives. However in order to minimize the possibility of blending errors or lack of substantial uniformity from formulation to formulation, and to facilitate the preparation of such formulations, it is preferable to mix with the polymer a preformed blend comprised of components (a) and (b) in which the components are already in suitable proportions.

Of the above three groups of polymers, preferred are vinylaromatic polymers with which have been blended a flame retardant amount of components (a) and (b).

Vinylaromatic polymers that can be flame retarded in the practice of this invention can be homopolymers, copolymers or block polymers and such polymers can be formed from such vinylaromatic monomers as styrene, ring-substituted styrenes in which the substituents are one or more $C_{1-6}$ alkyl groups, alpha-methylstyrene, ring-substituted alpha-methylstyrenes in which the substituents are one or more $C_{1-6}$ alkyl groups, vinylnaphthalene, and similar polymerizable styrenic monomers—i.e., styrenic compounds capable of being polymerized, e.g., by means of peroxide or like catalysts, into thermoplastic resins. Homopolymers and copolymers of simple styrenic monomers (e.g., styrene, p-methyl-styrene, 2,4-dimethylstyrene, alpha-methyl-styrene, p-chloro-styrene, etc.) are preferred from the standpoints of cost and availability. The vinylaromatic polymers that are flame retarded pursuant to this invention can be homopolymers or copolymers can be produced by free-radical polymerization, cationically-initiated polymerization, or anionically-initiated polymerization. In addition, the vinylaromatic polymers that are flame retarded in the practice of this invention can be foamable, expanded, or foamed vinylaromatic polymer compositions. The vinylaromatic polymers can have various structural configurations. For example they can be isotactic polymers, syndiotactic polymers, or mixtures of isotactic and syndiotactic polymers. In addition the vinylaromatic polymers can be in the form of blends or alloys with other thermoplastic polymers, such as polyphenylene ether-styrenic polymer blends and polycarbonate-styrenic polymer blends. The vinylaromatic polymers can be impact-modified or rubber-modified polymers.

Impact-modified polystyrenes (IPS) that are preferably used may be medium-impact polystyrene (MIPS), high-impact polystyrene (HIPS), or blends of HIPS and GPPS (sometimes referred to as crystal polystyrene). These are all conventional materials. The rubber used in effecting impact modification is most often, but need not be, a butadiene rubber. High-impact polystyrene or blends containing a major amount (greater than 50 wt %) of high-impact polystyrene together with a minor amount (less than 50 wt %) of crystal polystyrene are particularly preferred as the substrate or host polymer.

Among suitable vinyl aromatic monomers used in forming the vinylaromatic polymers are those which have the formula:

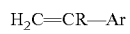

wherein R is a hydrogen atom or an alkyl group having from 1 to 4 carbon atoms and Ar is an aromatic group (including alkyl-ring substituted aromatic groups) of from 6 to 10 carbon atoms. Examples of such monomers are styrene, alpha-methylstyrene, ortho-methylstyrene, meta-methylstyrene, para-methylstyrene, para-ethylstyrene, isopropenyltoluene, vinylnaphthalene, isopropenylnaphthalene, vinylbiphenyl, vinylanthracene, the dimethylstyrenes, and tert-butylstyrene. Polystyrene is the preferred reactant. The weight average molecular weights of the vinylaromatic polymers that are flame retarded pursuant to this invention can vary widely, from low molecular weight polymers to very high molecular weight polymers. Methods for producing styrenic polymers such as general purpose polystyrenes, impact-modified polystyrenes, foamed or expandable polystyrenes, syndiotactic polystyrenes, and blends or alloys of styrenic polymers with other thermoplastic polymers are reported in the literature. See for example *Encyclopedia of Polymer Science and Technology*, copyright 1970 by John Wiley & Sons, Inc., Volume 13, especially the section entitled Styrene Polymers, and references cited therein; Kirk-Othmer *Encyclopedia of Chemical Technology*, copyright 1997 by John Wiley & Sons, Inc., especially the sections entitled Styrene Plastics; U.S. Pat. Nos. 4,173,688; 4,174,425; 4,287,318; 4,367,320; 4,393,171; 4,425,459; 4,940,735; 4,978,730; 5,045,517; 5,169,893; 5,189,125; 5,196,490; 5,252,693; 5,352,727; 5,446,117; 5,502,133; 5,741,837; 5,777,028; 5,902,865; 6,008,293; 6,031,049; 6,048,932; 6,593,428; and references cited therein. The disclosures in the foregoing documents pertaining to preparation of any such vinylaromatic polymer(s) or pertaining to mixtures, blends, or alloys thereof with other substances are incorporated herein by reference.

Preferred high-impact polystyrene compositions of this invention have the capability of forming molded specimens of 1.6 and 3.2 millimeter thickness (1/16 and 1/8-inch thickness) that pass at least the UL 94 V2 test.

Another group of thermoplastic polymers which may be effectively flame retarded by inclusion of components (a) and (b) with or without conjoint use of other suitable additives pursuant to this invention is polyolefins. Non-limiting examples of suitable polyolefins include polyethylene; polypropylene; poly-(1-butene); copolymers of ethylene with one or more higher vinyl olefins such as propylene, 1-butene, 1-pentene, 3-methyl-1-butene, 1-hexene, 4-methyl-1-pentene, 1-heptene, 1-octene; copolymers of propylene with one or more higher vinyl olefins; copolymers of ethylene, propylene and one or more diene monomers; and blends or mixtures of any of the foregoing. Methods for preparing such polymers are known and reported in the literature. See for example, *Encyclopedia of Polymer Science and Technology*, Interscience Publishers, a division of John Wiley & Sons, Inc. New York, especially sections entitled Ethylene Polymers; Propylene Polymers; Butylene Polymers; and Olefin Polymers, and references cited therein; Kirk-Othmer *Encyclopedia of Chemical Technology*, John Wiley & Sons, Inc.; U.S. Pat. Nos. 4,288,579; 4,619,981; 4,752,597; 4,980,431; 5,324,800; 5,644,008; 5,684,097; 5,714,555; 5,618,886; 5,804,679; 6,034,188; 6,121,182; 6,121,402; 6,204,345; 6,437,063; 6,458,900; 6,486,275; 6,555,494; and references cited therein. The disclosures in the foregoing documents pertaining to preparation of polyolefin polymers or resins are incorporated herein by reference.

The flame retardant combinations of components (a) and (b) with or without conjoint use of other suitable additives pursuant to this invention may also be used for imparting flame retardancy to such polymers or resins as ABS (acrylonitrile-butadiene-styrene polymer), SAN (styrene-acrylonitrile polymer), ASA (acrylonitrile-styrene-butyl acrylate copolymer), MBS (methacrylonitrile-butadiene-styrene polymer), and similar polymers, resins, and polyblends. Of these polymers ABS is preferred. Methods for the production of polymeric substances of this type are reported in the literature. See for example, Kirk-Othmer *Encyclopedia of Chemical Technology*, copyright 1997 by John Wiley & Sons, Inc., especially the sections entitled Styrene Plastics; U.S. Pat. Nos. 3,957,912; 4,064,116; 4,141,932; 4,141,932; 4,141,933; 4,206,293; 4,252,911; 4,262,096; 4,277,574; 4,341,695; 4,385,157; 4,421,895; 4,598,124; 4,640,959; 4,740,560; 5,807,928; 5,955,540; 6,391,965; 6,403,723; and references cited therein. The disclosures in the foregoing documents pertaining to preparation of polymers or resins of this general type in which styrene is one of the monomers used in forming a copolymer with at least one copolymerizable monomer other than another styrenic monomer are incorporated herein by reference.

Also provided by this invention are molded or extruded articles formed from any of the flame retardant compositions of this invention, of which the flame retardant vinylaromatic polymers are preferred. Yet another aspect of this invention is a method of producing a flame-retarded vinylaromatic polymer article which comprises molding or extruding at a temperature of up to 250° C., a melt blend of a vinylaromatic composition of this invention.

Other Components

In the practice of this invention various other components can be used in conjunction with components (a) and (b), provided no such other component materially detracts from the performance of the overall flame retardant composition. These other components may be included in the flame retardant additive compositions of this invention or in the flame retardant polymer compositions of this invention, or both.

One optional type of additive which can be used, and preferably is used, are flame retardant aids or synergists, especially one or more antimony oxides such as antimony pentoxide, and most especially antimony trioxide. Alkali metal antimonates such as sodium antimonate can also be used either together with or in place of an antimony oxide. Amounts of one or more antimony oxides and/or one or more alkali antimonates used can vary, but typically such synergists will be used in amounts such that the brominated flame retardant(s):antimony synergist(s) weight ratio is in the range of about 0.5:1 to about 10:1. Preferably this weight ratio will be in the range of about 2:1 to about 5:1, and most preferably is about 3:1.

In lieu of or in addition to one or more antimony oxides and/or one or more alkali metal antimonates, use can be made of other flame retardant aids or synergists. Among such other suitable materials that can be used for this purpose include one or more zinc borates (including mixed oxides of boron and zinc), calcium borate (including mixed oxides of boron and calcium), barium sulfate, zinc stannate and similar known flame retardant aids or synergists. These materials can be used in the same proportions as those given above. Thus while the amounts used can vary, typically these synergists will be used in amounts such that the brominated flame retardant(s):synergist(s) weight ratio is in the range of about 0.5:1 to about 10:1. Preferably this weight ratio will be in the range of about 2:1 to about 5:1, and most preferably is about 3:1.

Antioxidants that can be used, if desired, include phenolic antioxidants, many of which are available as articles of commerce, and organic phosphite esters, a number of which are also commercially available. It is also possible to use other halogen-containing and/or phosphorus-containing flame retardants as long as the flame retardancy effectiveness and desirable performance characteristics provided by use of the combination of components (a) and (b) is not materially harmed. If another flame retardant is used and it contains bromine, the amount of bromine provided thereby should be taken into consideration in connection with the total amount of bromine provided to the substrate polymer as discussed below. While the amount of any such other flame retardant, whether halogen-containing or phosphorus-containing, if used, can vary, it is preferable that at least about 50 wt % and more preferably at least 75 wt % of the total bromine from flame retardant additives in the substrate polymer be provided by components (a) and (b). Usually it is most preferable to avoid use of any other halogen-containing or phosphorus-containing flame retardant in the compositions of this invention. The most preferred flame retardant additive compositions and the most preferred flame retardant polymer compositions of this invention are devoid of any other halogen-containing flame retardant additive and any phosphorus-containing flame retardant. Other optional additives, such as other metal deactivators, UV stabilizers, pigments and dyes, processing aids, fillers, acid scavengers, thermal stabilizers, blowing agents, lubricants, nucleating agents, anti-static agents, plasticizers, impact modifiers, and related materials, can be included in the compositions of this invention as is appropriate. The amounts of these additives used, if used, will typically be as recommended by the manufacturer for obtaining the particular property enhancement for which the additive is employed.

Amount of Flame Retardant in Polymers

In the practice of this invention components (a) and (b) are blended with the substrate polymer, separately or preferably in combination, in a flame retardant amount, i.e., in an amount which yields a composition that satisfies at least the minimum requirements for the test procedure(s) applicable to the particular end use to which the polymer composition is intended to be put. In general, the flame retardant polymer compositions of this invention should provide test specimens that at least pass the V2 UL 94 test procedure. Typically the finished blend of polymer and flame retardant components (a) and (b) proportioned relative to each other as described above should provide a total bromine content in the range of about 2 to about 25 wt %, preferably in the range of about 5 to about 20 wt %, and most preferably in the range of about 8 to about 18 wt %, based on the weight of components (a) and (b) and the substrate polymer. In other words, these amounts exclude the weight of any other additive component(s) that may be introduced into the polymer during the blending, except for optional other bromine-containing flame retardant(s), the bromine contribution of which is to be taken into consideration as noted above. These flame retardant amounts will vary within the forgoing ranges depending upon the type of substrate or host polymer is present. For example with HIPS, amounts in the range of about 8 to about 12 wt % of total bromine are desirable with amounts of about 10 wt % being especially desirable. In the case of polyolefin polymers (which are hydrocarbon polymers that are acyclic except when a cycloaliphatic comonomer such as norbornadiene is used) amounts of total bromine in the range of about. 10 to about 30 wt % of bromine are desirable with amounts in the range of about 15 to about 25 wt % being especially desirable. With styrenic copolymers with functionalized monomers and with or without diene (ABS, SAN, MBS, ASA, etc.) amounts of total bromine in the range of about 9 to about 15 wt % of bromine are desirable with amounts in the range of about 10 to about 13 wt % being especially desirable.

It will be appreciated that the proportions given anywhere herein for specified components or substances, although typical, are nonetheless approximate, as departures from one or more of the ranges given herein are permissible whenever deemed necessary, appropriate or desirable in any given situation in order to achieve the desired flame retardancy (e.g., passing with at least a UL V-2 rating, while achieving other desired physical properties for the intended use of the finished composition. Thus to achieve the optimum combination of flame retardancy, strength properties, and other properties, a few preliminary tests with the materials to be used is usually a desirable way to proceed in any given situation in which the optimum composition of a particular formulation referred to herein has not already been established with the materials at hand.

Blending and Molding Procedures

The flame retardant additive compositions of this invention can be formed as powder blends comprised of components (a) and (b) and other selected optional components. Because component (a) is itself a polymeric material, blends of components (a) and (b) can be formed by intimately mixing component (b) and if desired, other selected components, with heat-softened component (a). Another way of preparing flame retardant additive compositions of this invention is to form a blend or master batch of components (a) and (b) in a substrate or host polymer such as polystyrene, polyethylene, polypropylene, or the like, where the components (a) and (b) are suitably proportioned relative to each other but are in a higher concentration than the flame retardant level to be used in the finished flame retardant polymer. In all cases it is preferred to pelletize the flame retardant additive composition comprised of components (a) and (b), with or without one or more other optional components, thereby providing the additive in a dust-free, readily-handleable form. For this purpose use can be made of commercially-available pellet mills and associated apparatus which will extrude molten strands of a flame retardant polymer composition of this invention and cut the strands into pellets.

The flame retardant polymer compositions of this invention can be prepared by use of conventional blending equipment such as a twin-screw extruder, a Brabender mixer, or similar apparatus. As noted above, it is possible to add the several components of the flame retardant compositions of this invention to the base polymer individually or in any combinations. Preferably, however, a preformed additive composition or a master batch of this invention is blended with the base thermoplastic resin.

Conventional molding procedures, such as injection molding, extrusion, or like known procedures can be performed using the thermoplastic polymer blends of this invention in producing finished articles therefrom. The articles so formed should not show significant color and viscosity degradation often experienced when using such techniques on GPPS or IPS which has been flame retarded with a brominated cycloaliphatic flame retardant. Similarly, the thermal degradation of polyolefins such as polypropylene, which typically results in viscosity degradation, should be reduced, if not eliminated, when maintaining the flame retarded polyolefin composition of this invention at elevated temperatures during processing.

To prepare flame retardant foamed or expandable polymer compositions of this invention a flame retardant combination of this invention can be included before, during, and in some cases after, the foamed or expandable product has been formed. For example, to produce a flame retardant extruded styrenic polymer such as XPS, at least (i) a vinylaromatic polymer, (ii) a preformed flame retardant additive composition of this invention or at least separate amounts of components (a) and (b) suitably proportioned relative to each other plus any other optional components all pursuant to this invention, and (iii) a blowing agent are mixed in an extruder, and the resultant mixture is extruded through a die providing the desired dimensions of the product, such as boards with various thicknesses and widths. A typical method of producing a flame retardant expandable styrenic polymers of this invention such as EPS involves suspension polymerization in water of a mixture of at least (i) styrene monomer(s) and (ii) a preformed flame retardant additive composition of this invention or at least separate amounts of components (a) and (b) suitably proportioned relative to each other plus any other optional components all pursuant to this invention, to thereby form beads of styrenic polymer. The small beads (e.g., averaging about 1 mm in diameter) so formed are then pre-expanded with steam and then molded again with steam to produce large blocks which can be several meters high, and 2–3 meters wide, that will be cut in the desired dimensions.

Synergistic Compositions of the Invention

Plots using computer generated regressions of capillary rheometry viscosities of blends of a brominated anionic polystyrene (Saytex® HP-3010 flame retardant; Albemarle Corporation), decabromodiphenylethane (Saytex® 8010 flame retardant; Albemarle Corporation), and a HIPS (Dow F200 HIPS) at an elevated temperature (viz., 250° C.), indicate that there are regions—which will vary depending on temperature, shear rate, and bromine contents of components (a) and (b)—where synergistic increases in melt flow can be achieved. Use of proportions of components (a) and (b) that produce a synergistic increase in capillary rheometry viscosities at 250° C. constitutes a preferred embodiment of this invention.

The practice and advantageous features of this invention are illustrated by the following examples which are not intended to limit the scope of this invention to only the subject matter therein disclosed.

EXAMPLES 1–9 AND REFERENCE EXAMPLES A–F

In Examples 1–9 and Reference Examples A–F formulations containing HIPS were prepared and test specimens were molded and subjected to a variety of tests to determine the properties of the respective compositions. In forming these compositions, the powders and resin pellets were hand mixed in a plastic bag prior to extrusion. The compounding of the formulations was done on a Werner & Pfleiderer ZSK 30 twin-screw extruder at 175 rpm. The temperature profile was 210-210-210-220-220° C. Pelletizing was conducted by use of the chopped strand method. All the materials had a holding time of 14 seconds, cooling time of 15 seconds, and mold open time of 2 seconds. The compounds were molded using the following conditions:

temperature profile=199-210-216-229° C.

mold temperature=38° C.

injection pressure=1250 psi on ram holding pressure=900 psi on ram.

The following ASTM test procedures were performed on the samples: Tensile Strength (D638) specimen type 1; Flexural Strength (D790) method 1; Deflection temperature under load (D648) ⅛" at 264 psi; IZOD Impact Strength (D256) method A; Gardner Impact Strength (D3029); Xenon Arc UV stability testing (D4459-86)—color measurements taken at 100, 200, & 300 hours; and Melt Flow Index (D1238) procedure A, 230° C./3.8 Kg. Also, the UL-94 flammability test was performed. The color measurements were made using HunterLab scale, D65 illuminant, 10° observer, and integrated-sphere geometry. Melt stability by capillary rheometry was performed on a Kayness L-6000 capillary rheometer at 250° C., at a shear rate of 500/sec, with 6 minutes of preheat.

The test work was conducted using groups of five test samples in each group. The makeup of the compositions tested and the test results obtained thereon are summarized in Tables 1–3. In these Tables the anionic polystyrene used was Saytex® HP-3010 flame retardant (Albemarle Corporation). Each Table shows the melt flow index of the particular lot of the anionic polystyrene used.

TABLE 1

Formulations and Compound Data, Standard HP-3010/8010 Blends in HIPS

| Ingredient | Ref. Ex. | Ex. 1 | Ex. 2 | Ex. 3 | Ref. Ex. |
|---|---|---|---|---|---|
| Dow F200 HIPS | 80.4 | 81.3 | 82.2 | 83.1 | 84.0 |
| Saytex ® HP-3010 flame | 14.7 | 11.0 | 6.0 | 3.7 | — |
| Saytex ® 8010 flame | — | 3.0 | 7.4 | 9.0 | 12.0 |
| Antimony Trioxide | 4.9 | 4.7 | 4.4 | 4.2 | 4.0 |
| Wt Ratio HP-3010/8010 | 100/0 | 78.6/21.4 | 44.8/55.2 | 29.1/70.9 | 0/100 |
| Xenon Arc Weathering | | | | | |
| $\Delta L$, 100 hrs. | −15.8 | −18.8 | −17.9 | −18.1 | −18.5 |
| $\Delta a$, 100 hrs. | 4.1 | 5.9 | 5.3 | 5.2 | 3.9 |
| $\Delta b$, 100 hrs. | 22.2 | 23.3 | 22.6 | 21.9 | 17.8 |
| $\Delta E$, 100 hrs. | 27.5 | 30.6 | 29.3 | 28.9 | 26.0 |
| Yellowness Index, 100 hrs. | 50.6 | 54.8 | 53.0 | 52.2 | 45.2 |
| $\Delta L$, 200 hrs. | −28.5 | −30.3 | −24.8 | −23.1 | −23.3 |
| $\Delta a$, 200 hrs. | 10.1 | 11.1 | 8.7 | 7.5 | 4.7 |
| $\Delta b$, 200 hrs. | 23.1 | 23.0 | 23.4 | 22.8 | 18.2 |
| $\Delta E$, 200 hrs. | 38.1 | 39.6 | 35.2 | 33.3 | 29.9 |
| Yellowness Index, 200 hrs. | 63.4 | 64.6 | 60.3 | 58.0 | 49.2 |
| $\Delta L$, 300 hrs. | −40.7 | −40.1 | −34.6 | −28.6 | −26.1 |
| $\Delta a$, 300 hrs. | 11.9 | 12.4 | 11.7 | 10.0 | 5.7 |
| $\Delta b$, 300 hrs. | 18.5 | 19.0 | 21.0 | 22.1 | 18.7 |
| $\Delta E$, 300 hrs. | 46.2 | 46.1 | 42.1 | 37.5 | 32.6 |
| Yellowness Index, 300 hrs. | 65.2 | 65.4 | 64.5 | 61.8 | 52.4 |
| Notched Izod, ft-lb/in. | 0.92 | 0.99 | 1.41 | 1.46 | 1.16 |
| Gardner Impact, in-lb/in. | 70 | 60 | 58 | 71 | 66 |
| HDT @ 264 psi, ° C. | 78 | 77 | 76 | 76 | 76 |
| UL-94 @ ¼" | V-0 | V-0 | V-0 | V-0 | V-2 |
| Flaming Drips | No | No | No | No | 2 |
| Burn Time T1/T2, seconds | 5.1/7.6 | 4.2/6.1 | 3.9/5.0 | 3.7/7.5 | 4.1/12.0 |
| Total Burn Time, seconds | 12.7 | 10.3 | 8.9 | 11.2 | 16 |
| UL-94 @ ⅛" | V-2 | V-2 | V-2 | V-2 | V-2 |
| Flaming Drips | 4 | 5 | 4 | 5 | 5 |
| Burn Time T1/T2, seconds | 56/28 | 11.4/6.5 | 8.8/6.9 | 8.3/13.2 | 5.1/7.6 |
| Total Burn Time, seconds | 84 | 18 | 15.7 | 21.5 | 12.7 |
| Melt Stability @ 250° C., 500 | Stable | Stable | Stable | Stable | Stable |
| Viscosity @ 6.5 min, Pa * sec | 154 | 152 | 179 | 182 | 187 |
| Viscosity @ 13 min, Pa * sec | 155 | 154 | 180 | 183 | 190 |
| Viscosity @ 19.5 min, | 157 | 155 | 183 | 187 | 192 |
| Viscosity @ 25.9 min, | 159 | 158 | 184 | 188 | 195 |
| Viscosity @ 32.4 min, | 159 | 157 | 184 | 191 | 195 |
| MFI @ 200° C., 5.0 kg; | 4.0 | 4.0 | 4.1 | 3.9 | 4.1 |
| Tensile Strength @ Break, | 2920 | 2960 | 2640 | 2960 | 2960 |
| Tensile Strength @ Yield, | 3460 | 3480 | 3130 | 3460 | 3430 |
| Elongation @ Break, % | 23 | 25 | 23 | 24 | 27 |
| Elongation @ Yield, % | 1.2 | 1.2 | 1.3 | 1.3 | 1.3 |
| Tensile Modulus, kpsi | 344 | 342 | 307 | 342 | 343 |
| Flex Modulus, kpsi | 333 | 327 | 329 | 328 | 325 |

Figure 1B:
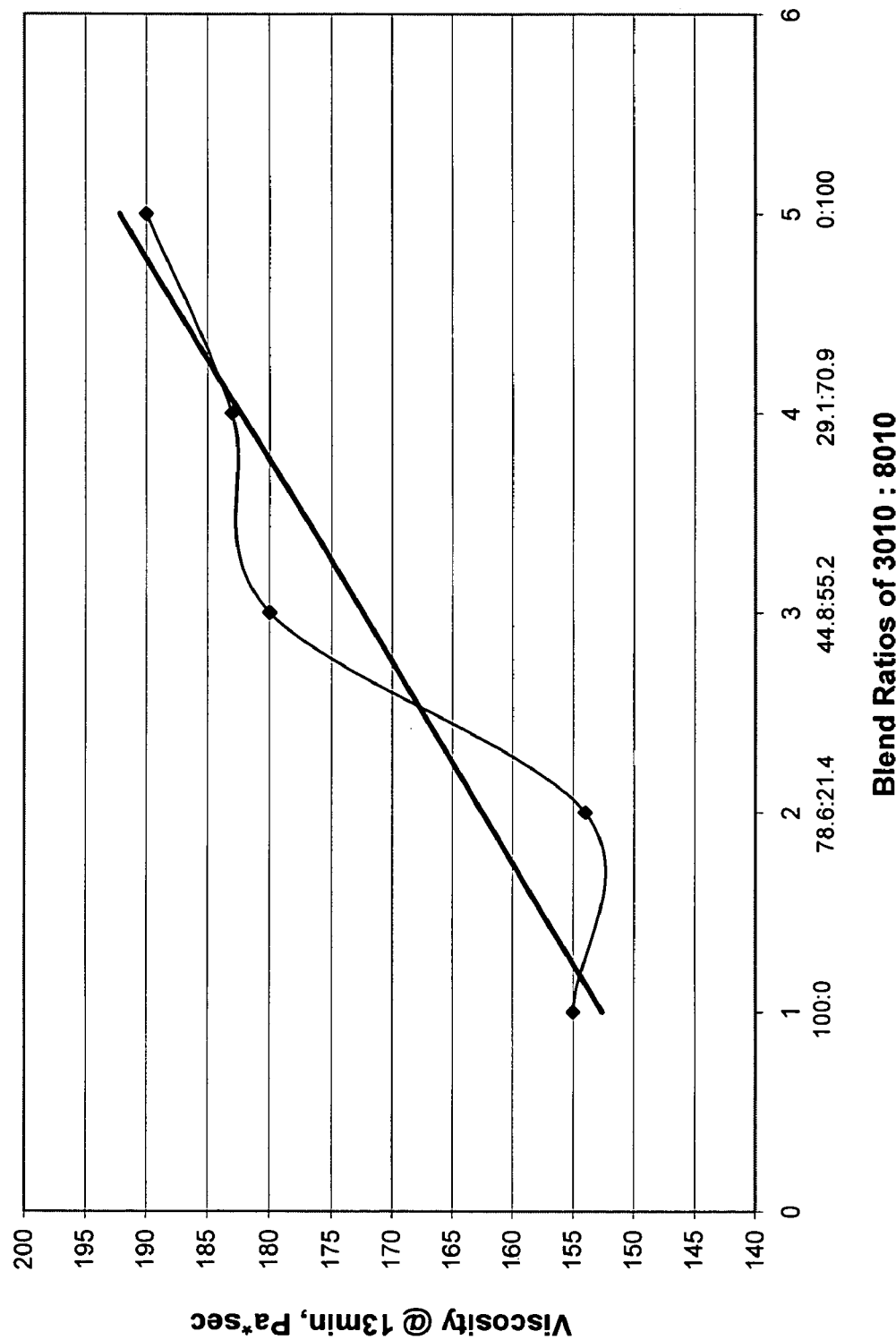
Figure 1C:
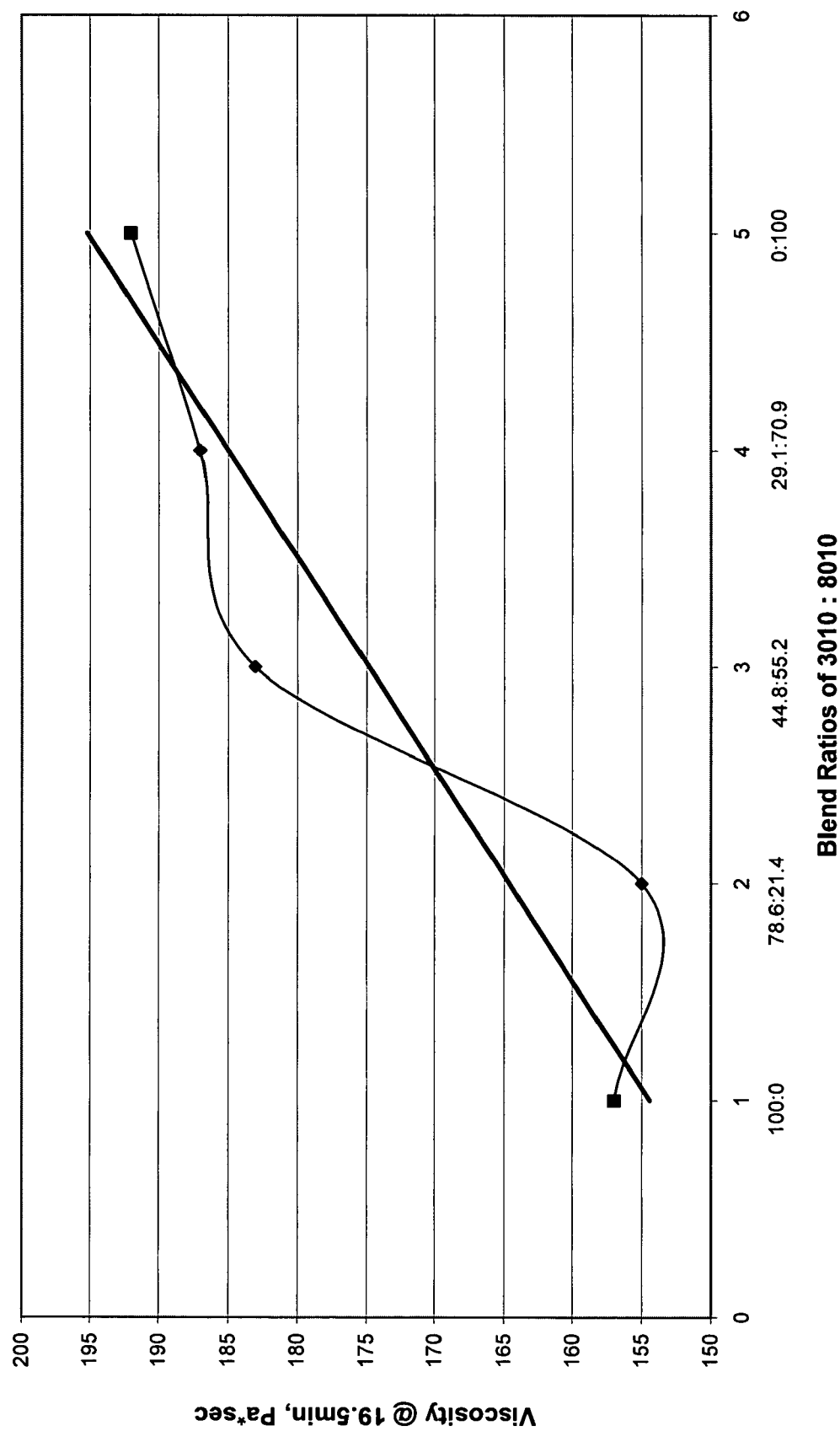
Figure 1D:
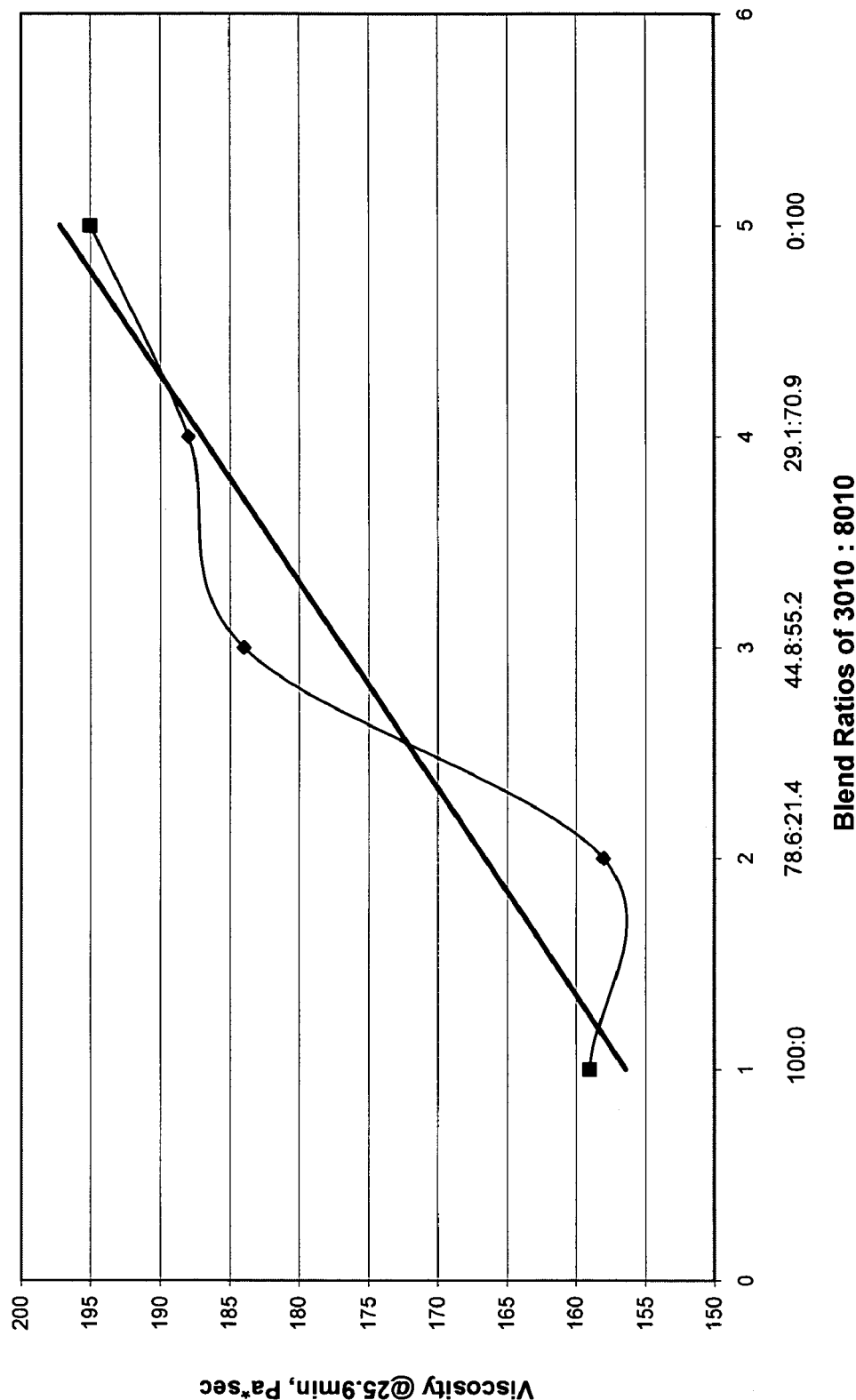
Figure 1E:
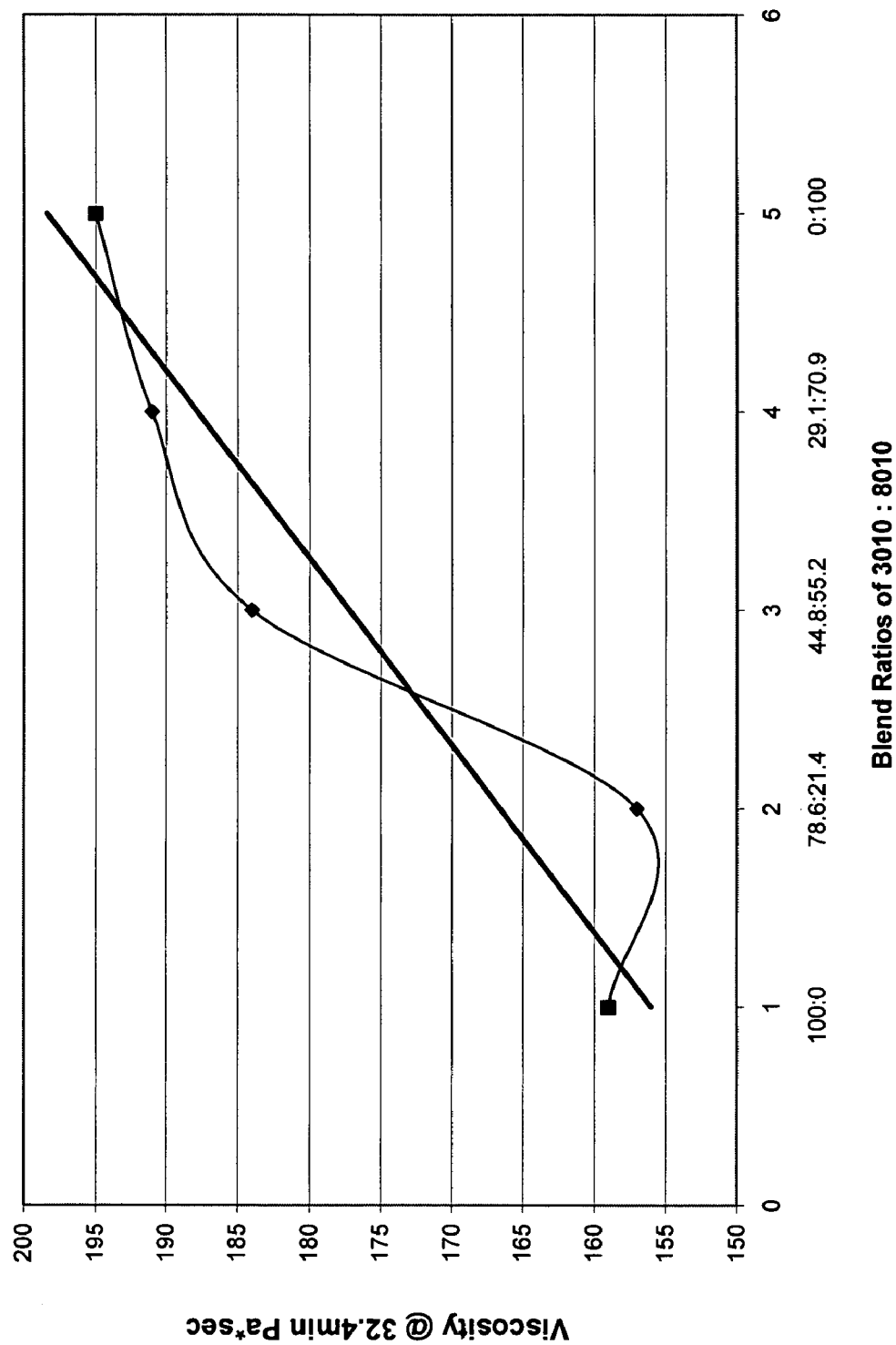

It will be seen from the data in Table 1 that the compositions of this invention (Examples 1–3) had V-0 ratings with ⅛ inch specimens even though as shown by Ref. Ex. B the composition devoid of the HP-3010 only gave a V-2 rating with ⅛ inch specimens. It is to be noted from the capillary rheometry viscosity data that in each case a significant viscosity reduction occurred in Example 1 as compared to Ref. Ex. B. In addition the capillary rheometry viscosity data as plotted in FIGS. 1A–1E show that in each case a synergistic reduction in viscosity occurred with mixtures having component (a):component (b) weight ratios in the range of about 96:4 to about 60:40. Other desirable characteristics can be seen by inspection of the data in Table 1.

TABLE 2

Formulations and Compound Data, Higher Flow HP-3010/8010 Blends in HIPS

| Ingredient | Ref. Ex. | Ex. 4 | Ex. 5 | Ex. 6 | Ref. Ex. |
|---|---|---|---|---|---|
| Dow F200 HIPS | 80.4 | 81.3 | 82.2 | 83.1 | 84.0 |
| Saytex HP-3010 flame | 14.7 | 11.0 | 6.0 | 3.7 | — |
| Saytex 8010 flame retardant | — | 3.0 | 7.4 | 9.0 | 12.0 |
| Antimony Trioxide | 4.9 | 4.7 | 4.4 | 4.2 | 4.0 |
| Wt Ratio HP-3010/8010 | 100/0 | 78.6/21.4 | 44.8/55.2 | 29.1/70.9 | 0/100 |
| Xenon Arc Weathering | | | | | |
| $\Delta L$, 100 hrs. | −17.3 | −18.3 | −18.6 | −17.4 | −18.5 |
| $\Delta a$, 100 hrs. | 4.6 | 5.5 | 5.6 | 4.9 | 3.9 |

TABLE 2-continued

Formulations and Compound Data, Higher Flow HP-3010/8010 Blends in HIPS

| Ingredient | Ref. Ex. | Ex. 4 | Ex. 5 | Ex. 6 | Ref. Ex. |
|---|---|---|---|---|---|
| Δb, 100 hrs. | 23.8 | 24.1 | 22.8 | 22.0 | 17.8 |
| ΔE, 100 hrs. | 29.8 | 30.8 | 30.0 | 28.5 | 26.0 |
| Yellowness Index, 100 hrs. | 51.7 | 53.8 | 53.8 | 51.1 | 45.2 |
| ΔL, 200 hrs. | −24.7 | −25.9 | −23.2 | −22.0 | −23.3 |
| Δa, 200 hrs. | 8.6 | 9.5 | 8.2 | 7.2 | 4.7 |
| Δb, 200 hrs. | 25.3 | 24.8 | 23.8 | 23.2 | 18.2 |
| ΔE, 200 hrs. | 36.4 | 37.1 | 34.2 | 32.8 | 29.9 |
| Yellowness Index, 200 hrs. | 60.9 | 61.8 | 59.7 | 57.2 | 49.2 |
| ΔL, 300 hrs. | −37.4 | −37.4 | −31.6 | −27.8 | −26.1 |
| Δa, 300 hrs. | 11.8 | 12.3 | 11.2 | 9.7 | 5.7 |
| Δb, 300 hrs. | 21.5 | 21.3 | 22.1 | 22.7 | 18.7 |
| ΔE, 300 hrs. | 45.1 | 44.7 | 40.2 | 37.2 | 32.6 |
| Yellowness Index, 300 hrs. | 65.1 | 65.3 | 64.1 | 61.3 | 52.4 |
| Notched Izod, ft-lb/in. | 1.1 | 1.4 | 1.4 | 1.5 | 1.16 |
| Gardner Impact, in-lb/in. | 67 | 79 | 66 | 62 | 66 |
| HDT @ 264 psi, ° C. | 77 | 76 | 76 | 76 | 76 |
| UL-94 @ ¼″ | V-1 | V-0 | V-0 | V-0 | V-2 |
| Flaming Drips | No | No | No | No | 2 |
| Burn Time T1/T2, seconds | 10.1/59.5 | 4.5/7.3 | 3.8/4.7 | 4.0/5.1 | 4.1/12.0 |
| Total Burn Time, seconds | 70 | 11.8 | 8.5 | 9.1 | 16 |
| UL-94 @ ⅛″ | V-2 | V-2 | V-2 | V-2 | V-2 |
| Flaming Drips | 4 | 5 | 5 | 5 | 5 |
| Burn Time T1/T2, seconds | 63/29 | 37/30 | 5.4.16.4 | 6.2/17.5 | 5.1/7.6 |
| Total Burn Time, seconds | 92 | 67 | 21.8 | 23.7 | 12.7 |
| Melt Stability @ 250° C., 500 | Stable | Stable | Stable | Stable | Stable |
| Viscosity @ 6.5 min, Pa * sec | 169 | 145 | 177 | 182 | 187 |
| Viscosity @ 13 min, Pa * sec | 171 | 147 | 178 | 185 | 190 |
| Viscosity @ 19.5 min, Pa * sec | 173 | 149 | 180 | 185 | 192 |
| Viscosity @ 25.9 min, Pa * sec | 175 | 151 | 183 | 186 | 195 |
| Viscosity @ 32.4 min, Pa * sec | 175 | 151 | 182 | 186 | 195 |
| MFI @ 200° C., 5.0 kg; | 4.7 | 4.7 | 4.2 | 4.0 | 4.1 |
| Tensile Strength @ Break, | 2950 | 3080 | 2650 | 2900 | 2960 |
| Tensile Strength @ Yield, | 3400 | 3400 | 3090 | 3470 | 3430 |
| Elongation @ Break, % | 35 | 42 | 24 | 20 | 27 |
| Elongation @ Yield, % | 1.2 | 1.2 | 1.2 | 1.3 | 1.3 |
| Tensile Modulus, kpsi | 329 | 326 | 313 | 342 | 343 |
| Flex Modulus, kpsi | 329 | 324 | 329 | 330 | 325 |

Figure 2A:
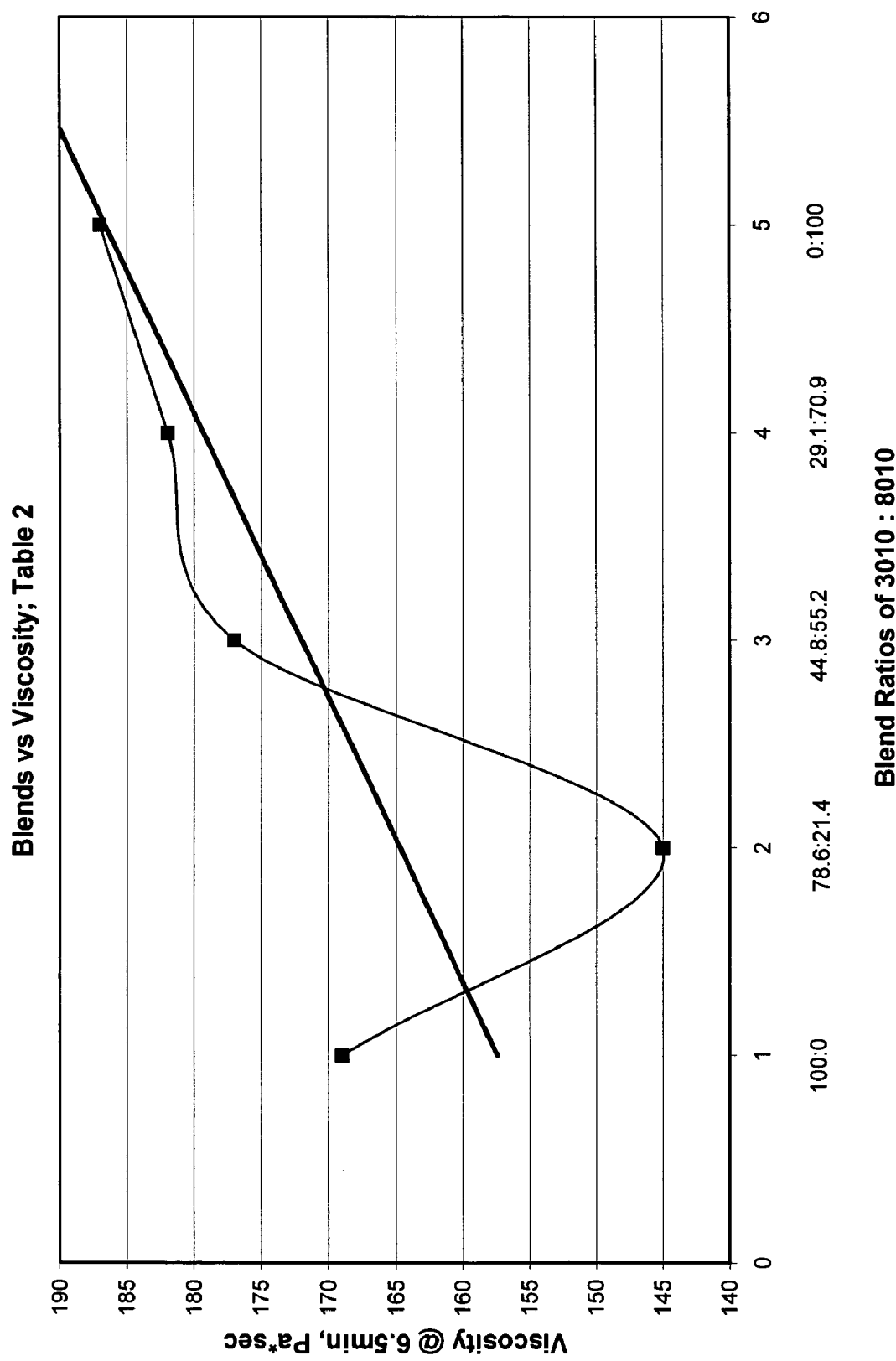
Figure 2B:
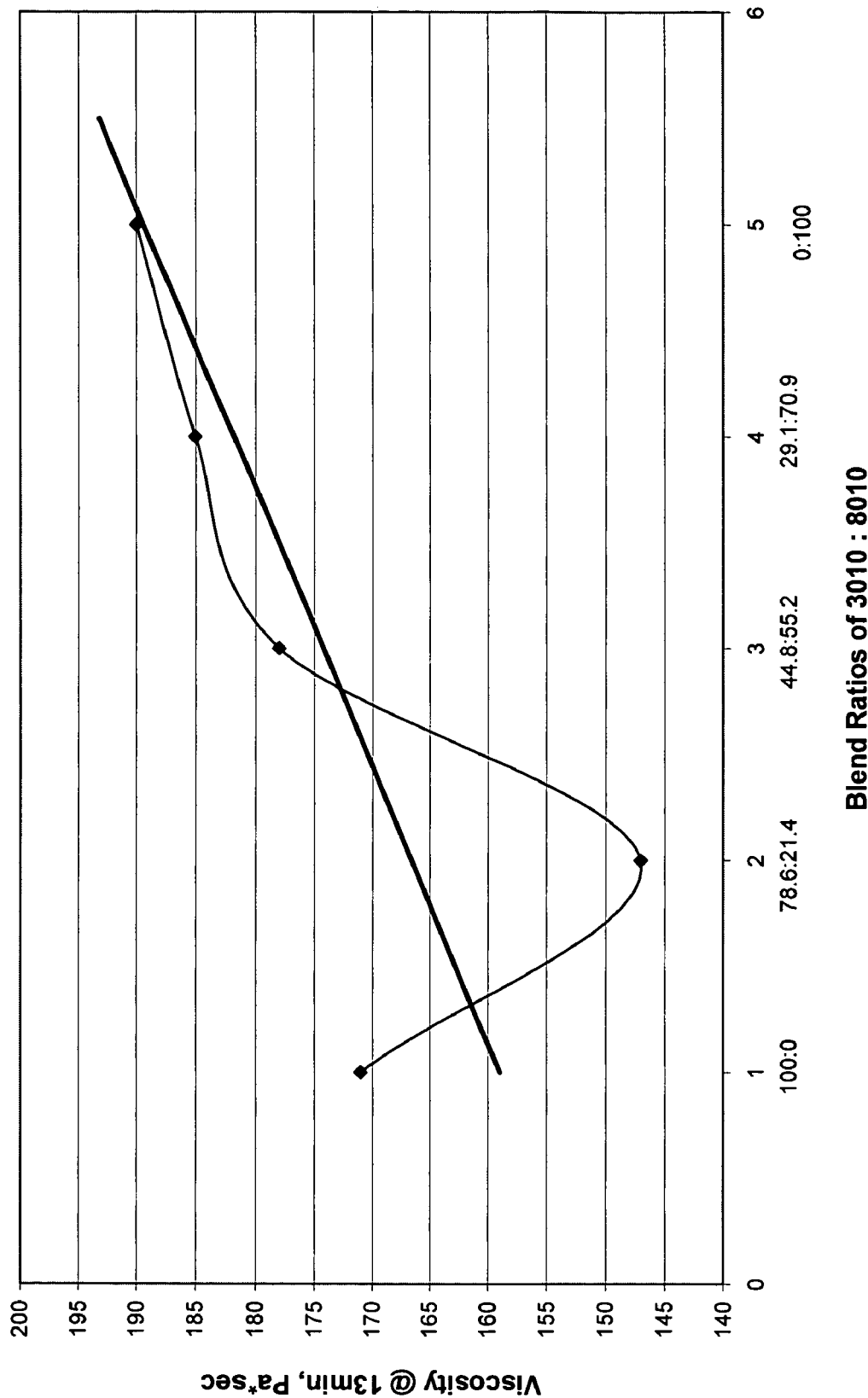
Figure 2C:
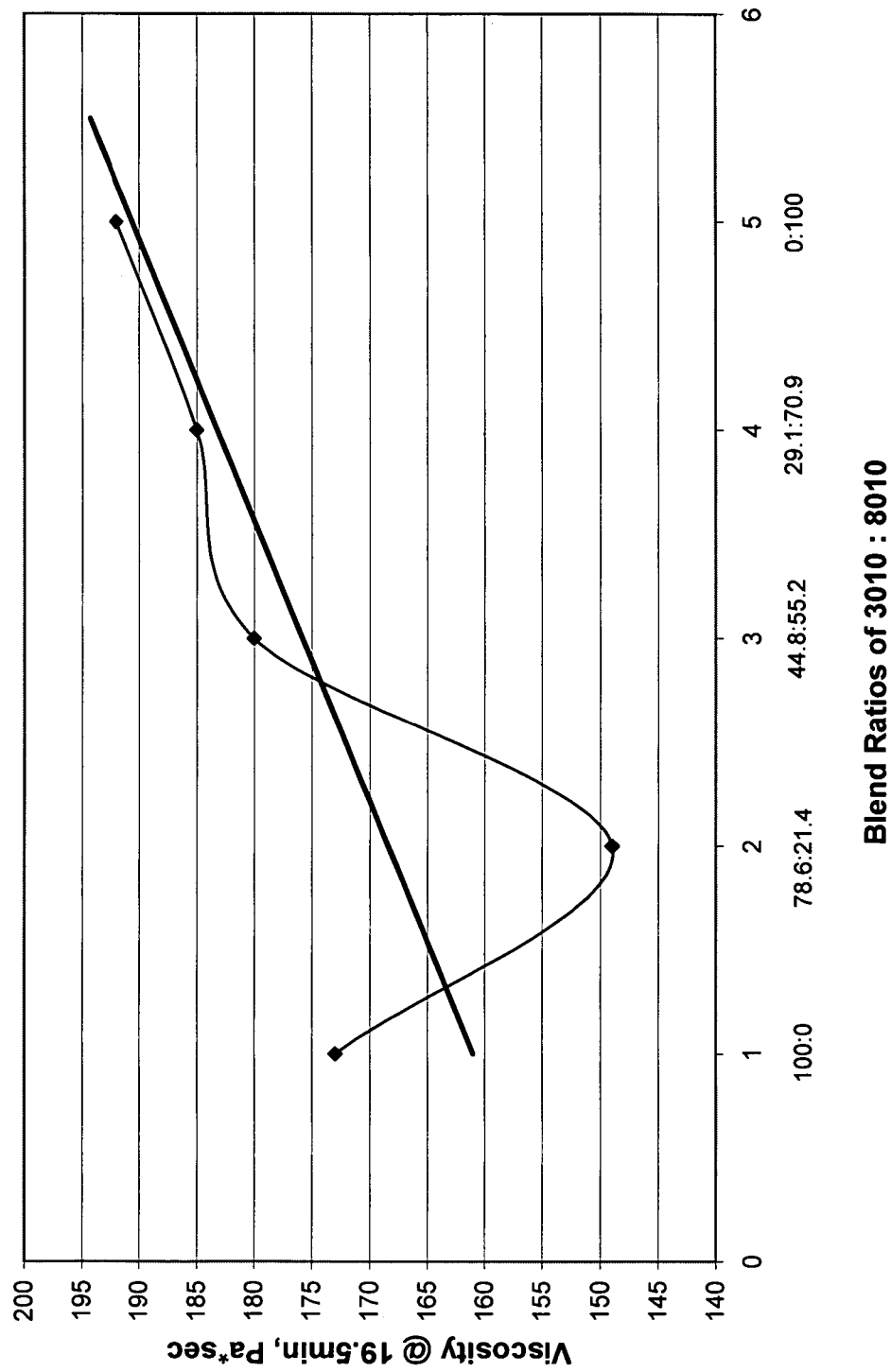
Figure 2D:
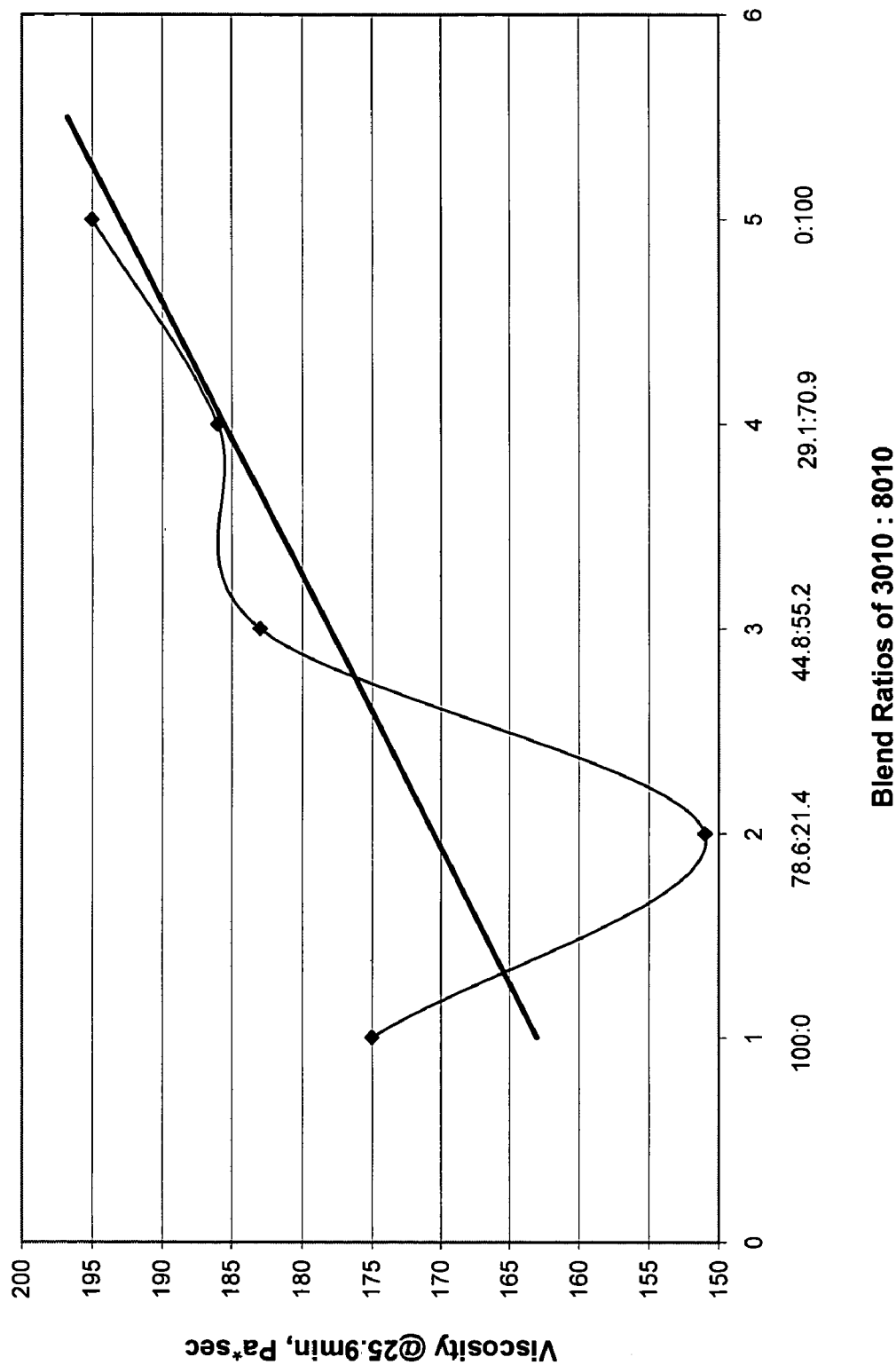

It will be seen from Table 2 that flame retardant effectiveness in the UL-94 tests with ⅛ inch test specimens was superior in each of Examples 4–6 as compared to Ref. Exs. C and D. Also in the melt stability data a significant reduction in viscosity exists in Example 4 as compared to Reference Example D. In addition the capillary rheometry viscosity data as plotted in FIGS. 2A–2E show that in each case a synergistic reduction in viscosity occurred with mixtures having component (a):component (b) weight ratios in the range of about 93:7 to about 53:47. Other data in Table 2 are in general in line with the results given in Table 1.

TABLE 3

Formulations and Compound Data, Intermediate Flow HP-3010/8010 Blends in HIPS

| Ingredient | Ref. Ex. | Ex. 7 | Ex. 8 | Ex. 9 | Ref. Ex. |
|---|---|---|---|---|---|
| Dow F200 HIPS | 80.4 | 81.3 | 82.2 | 83.1 | 84.0 |
| Saytex HP-3010 flame | 14.7 | 11.0 | 6.0 | 3.7 | — |
| Saytex 8010 flame retardant | — | 3.0 | 7.4 | 9.0 | 12.0 |
| Antimony Trioxide | 4.9 | 4.7 | 4.4 | 4.2 | 4.0 |
| Wt Ratio HP-3010/8010 | 100/0 | 78.6/31.4 | 44.8/55.2 | 29.1/70.9 | 0/100 |
| Xenon Arc Weathering | | | | | |
| ΔL, 100 hrs. | −15.4 | −18.2 | −17.6 | −16.7 | −18.5 |
| Δa, 100 hrs. | 3.9 | 5.6 | 5.3 | 4.7 | 3.9 |
| Δb, 100 hrs. | 23.6 | 24.1 | 23.0 | 22.4 | 17.8 |
| ΔE, 100 hrs. | 28.5 | 30.7 | 29.4 | 28.3 | 26.0 |
| Yellowness Index, 100 hrs. | 50.7 | 54.3 | 53.2 | 51.6 | 45.2 |
| ΔL, 200 hrs. | −32.1 | −26.1 | −23.2 | −24.2 | −23.3 |
| Δa, 200 hrs. | 11.2 | 10.0 | 8.5 | 8.3 | 4.7 |
| Δb, 200 hrs. | 23.6 | 25.0 | 24.3 | 23.2 | 18.2 |

TABLE 3-continued

Formulations and Compound Data, Intermediate Flow HP-3010/8010 Blends in HIPS

| Ingredient | Ref. Ex. | Ex. 7 | Ex. 8 | Ex. 9 | Ref. Ex. |
|---|---|---|---|---|---|
| ΔE, 200 hrs. | 41.4 | 37.5 | 34.7 | 34.6 | 29.9 |
| Yellowness Index, 200 hrs. | 65.3 | 63.1 | 60.6 | 59.4 | 49.2 |
| ΔL, 300 hrs. | −41.3 | −38.2 | −32.5 | −31.5 | −26.1 |
| Δa, 300 hrs. | 12.3 | 12.6 | 11.8 | 11.0 | 5.7 |
| Δb, 300 hrs. | 19.6 | 20.9 | 22.2 | 21.8 | 18.7 |
| ΔE, 300 hrs. | 47.4 | 45.3 | 41.0 | 39.8 | 32.6 |
| Yellowness Index, 300 hrs. | 65.5 | 66.2 | 64.7 | 63.2 | 52.4 |
| Notched Izod, ft-lb/in. | 1.1 | 1.1 | 1.5 | 1.5 | 1.16 |
| Gardner Impact, in-lb/in. | 61 | 76 | 57 | 52 | 66 |
| HDT @ 264 psi, ° C. | 78 | 77 | 77 | 77 | 76 |
| UL-94 @ ⅛" | V-0 | V-0 | V-0 | V-0 | V-2 |
| Flaming Drips | No | No | No | No | 2 |
| Burn Time T1/T2, seconds | 4.6/9.7 | 4.4/7.5 | 4.0/5.8 | 4.0/4.5 | 4.1/12.0 |
| Total Burn Time, seconds | 14.3 | 11.9 | 9.8 | 8.5 | 16 |
| UL-94 @ ¼" | V-2 | V-2 | V-2 | V-2 | V-2 |
| Flaming Drips | 5 | 5 | 5 | 3 | 5 |
| Burn Time T1/T2, seconds | 72/17 | 7.6/5.7 | 5.8/16.9 | 4.9/18.4 | 5.1/7.6 |
| Total Burn Time, seconds | 89 | 13.3 | 22.7 | 23.3 | 12.7 |
| Melt Stability @ 250° C., 500 | Stable | Stable | Stable | Stable | Stable |
| Viscosity @ 6.5 min, Pa * sec | 156 | 149 | 152 | 163 | 187 |
| Viscosity @ 13 min, Pa * sec | 157 | 151 | 159 | 164 | 190 |
| Viscosity @ 19.5 min, Pa * sec | 158 | 153 | 160 | 166 | 192 |
| Viscosity @ 25.9 min, Pa * sec | 161 | 154 | 156 | 168 | 195 |
| Viscosity @ 32.4 min, Pa * sec | 160 | 155 | 163 | 168 | 195 |
| MFI @ 200° C., 5.0 kg; | 4.0 | 4.3 | 3.9 | 3.8 | 4.1 |
| Tensile Strength @ Break, | 2980 | 3000 | 2960 | 2890 | 2960 |
| Tensile Strength @ Yield, psi | 3540 | 3490 | 3480 | 3500 | 3430 |
| Elongation @ Break, % | 24 | 30 | 23 | 19 | 27 |
| Elongation @ Yield, % | 1.2 | 1.2 | 1.2 | 1.2 | 1.3 |
| Tensile Modulus, kpsi | 352 | 338 | 347 | 348 | 343 |
| Flex Modulus, kpsi | 338 | 340 | 331 | 335 | 325 |

Figure 3A:
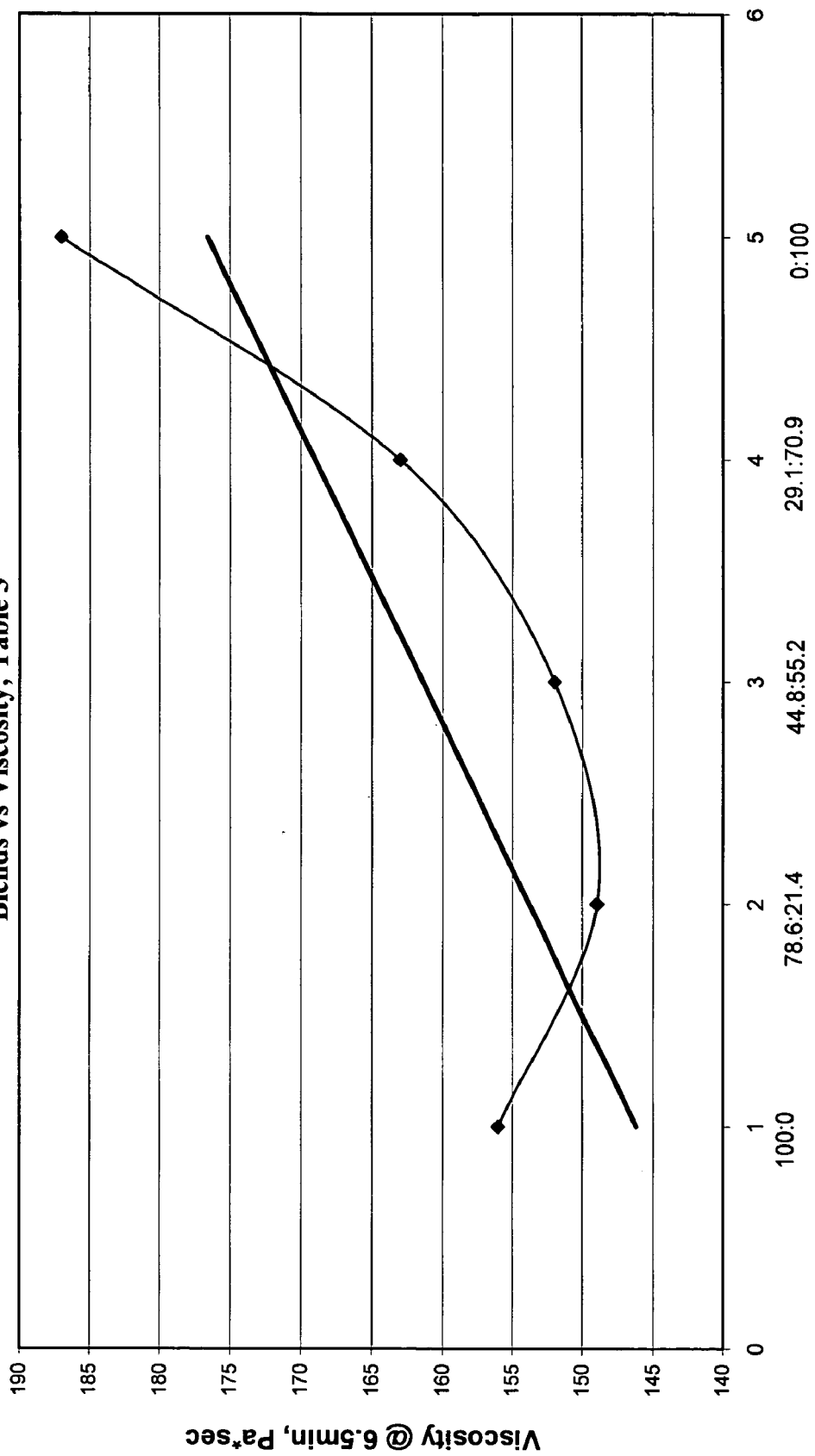
FIGS. 3A–3E are computer generated regression plots of the capillary rheometry viscosity data of the composition of Example 3 at 250° C. in Pascal-seconds taken at 6.5, 13, 19.5, 25.9, and 32.4 minutes, respectively, as given in Table 3.
Figure 3B:
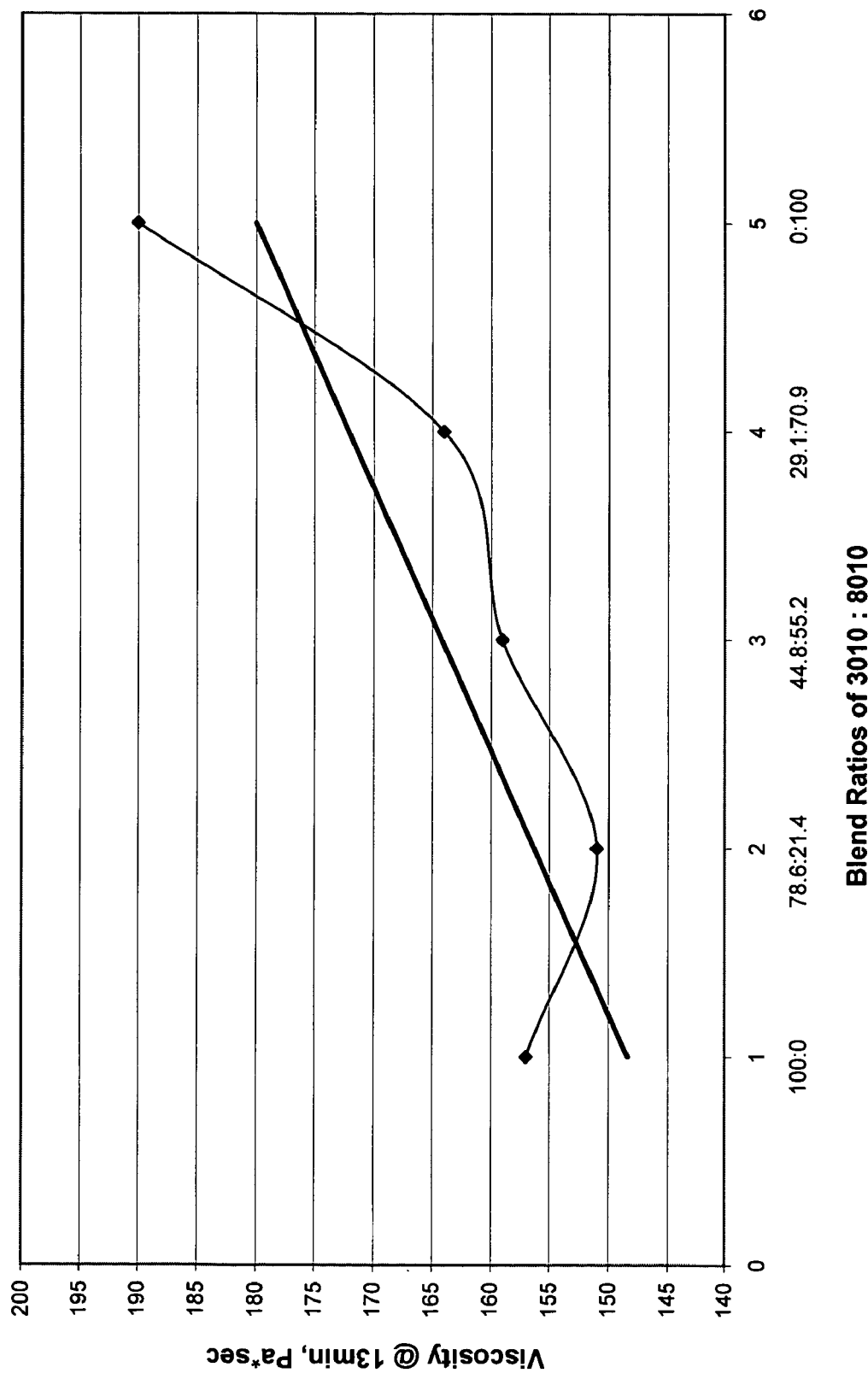
Figure 3C:
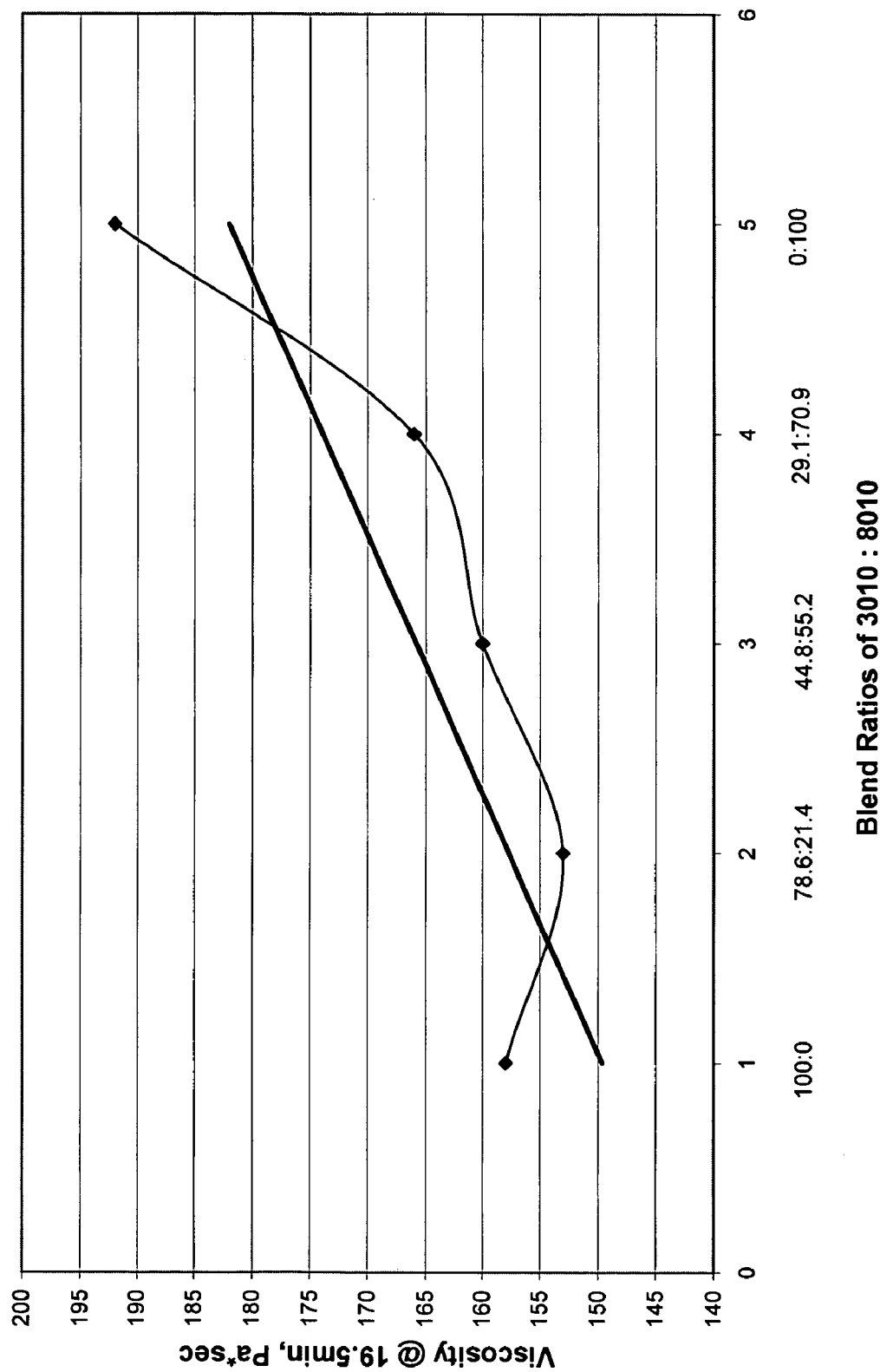
Figure 3D:
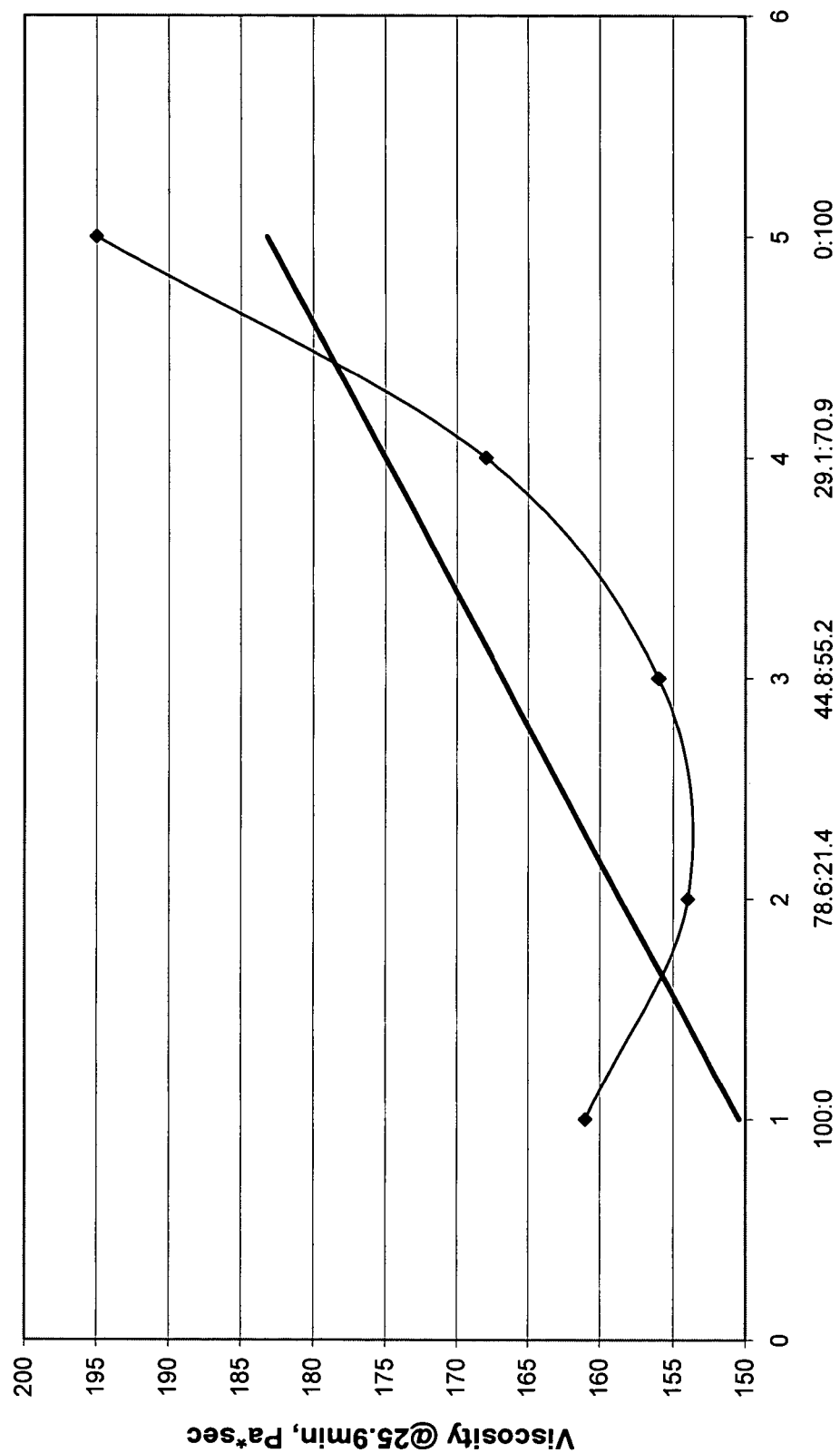
Figure 3E:
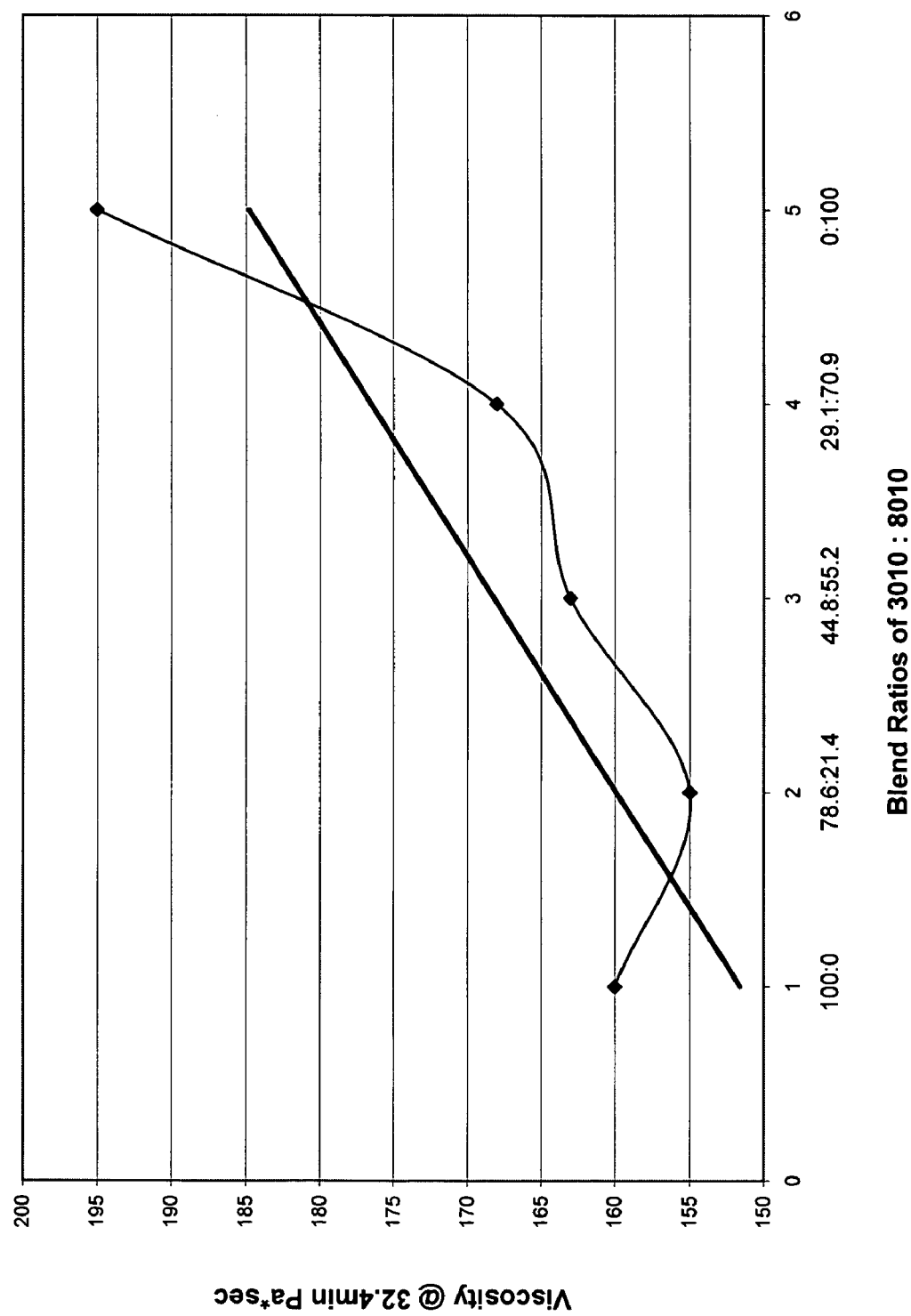

The data in Table 3 again show that superior flame retardancy was achieved in the UL-94 test with ⅛ inch specimens. Examples 7–9 gave V-0 ratings whereas in Ref. Ex. F the rating was only V-2. Here again a reduction in viscosity was achieved in Example 7 as compared to ref. Ex. F. In addition the capillary rheometry viscosity data as plotted in FIGS. 3A–3E show that in each case a synergistic reduction in viscosity occurred with mixtures having component (a):component (b) weight ratios in the range of about 87:13 to about 15:85.

EXAMPLES 10–11 AND REFERENCE EXAMPLE G

Test specimens for a more abbreviated series of standard test evaluations were prepared generally as described above and subjected to such tests. The compositions tested and results of these tests are summarized in Table 4.

TABLE 4

| | Ref. Ex. G | Ex. 10 | Ex. 11 |
|---|---|---|---|
| Dow F200 HIPS | 84% | 83.4% | 83% |
| 8010 flame retardant | 12% | 9.4% | 6.5% |
| HP-3010 flame retardant | — | 3.2% | 6.5% |
| Sb₂O₃ | 4% | 4% | 4% |
| % Br | 10 | 10 | 10 |
| Wt ratio 8010/Other | 100/0 | 75/25 | 50/50 |

TABLE 4-continued

| | Ref. Ex. G | Ex. 10 | Ex. 11 |
|---|---|---|---|
| Properties | | | |
| DTUL (° C.) | 74 | 74 | 75 |
| IZOD Impact Strength (ft-lb/in) | 1.5 | 1.4 | 1.5 |
| Melt Flow (g/10 min) 200 C/5 Kg | 4.0 | 5.0 | 4.9 |
| UL-94 @ ⅛" | V-2 | V-0 | V-0 |
| # drips ign. Cotton | 2 | 0 | 0 |
| total t1/t2 time (sec) | 4/8 | 4/4 | 3/4 |
| UL-94 @ ¼" | V-2 | V-2 | V-2 |
| # drips ign. Cotton | 4 | 5 | 5 |
| total t1/t2 time (sec) | 5/5 | 5/11 | 6/11 |

It will again be seen that improved flame retardant performance was achieved in the UL-94 test using ⅛ inch specimens in Examples 10 and 11 as compared to Ref. Ex. G. Also improved melt flow performance was achieved in Examples 10 and 11 as compared to Ref. Ex. G.

Compounds referred to by chemical name or formula anywhere in this document, whether referred to in the singular or plural, are identified as they exist prior to coming into contact with another substance referred to by chemical name or chemical type (e.g., another component, a solvent, or etc.). It matters not what chemical changes, if any, take place in the resulting mixture or solution, as such changes are the natural result of bringing the specified substances together under the conditions called for pursuant to this disclosure.

Also, even though the claims may refer to substances in the present tense (e.g., "comprises", "is", etc.), the reference is to the substance as it exists at the time just before it is first contacted, blended or mixed with one or more other substances in accordance with the present disclosure.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent or publication referred to in any portion of this specification is incorporated into this disclosure by reference, as if set forth herein.

This invention is susceptible to considerable variation in its practice. Therefore the foregoing description is not intended to limit, and should not be construed as limiting, the invention to the particular exemplifications presented hereinabove.

That which is claimed is:

1. A flame retardant composition comprising a polymer comprised of one or more polymerized monomers that had a polymerizable olefinic double bond in the molecule and with which polymer has been blended a flame retardant quantity of a flame retardant amount of (a) brominated anionic styrenic polymer, and (b) at least one polybrominated alpha-omega diphenylalkane having a total of at least 6 bromine atoms directly bonded to the phenyl rings and in the range of 1 to 6 carbon atoms in the alkylene group disposed between the phenyl groups, said alkylene group being a linear alkylene group and wherein the polymer is one or more acyclic olefinic hydrocarbon homopolymers or copolymers.

2. A composition as in claim 1 wherein the polymer is (i) polyethylene, (ii) polypropylene, (iii) isotactic polypropylene, (iv) syndiotactic polypropylene, (v) a mixture of isotactic and syndiotactic polypropylene, or (vi) at least one copolymer of ethylene or propylene with at least one higher olefin of up to about 10 carbon atoms, and optionally a diene monomer, or a mixture of any two or more of (i) through (vi).

3. A flame retardant composition comprising a polymer comprised of one or more polymerized monomers that had a polymerizable olefinic double bond in the molecule and with which polymer has been blended a flame retardant quantity of a flame retardant amount of (a) brominated anionic styrenic polymer, and (b) at least one polybrominated alpha-omega diphenylalkane having a total of at least 6 bromine atoms directly bonded to the phenyl rings and in the range of 1 to 6 carbon atoms in the alkylene group disposed between the phenyl groups, said alkylene group being a linear alkylene group and wherein the polymer is one or more copolymers of at least one vinylaromatic monomer and at least one non-vinylaromatic monomer containing a functional group.

4. A composition as in claim 3 wherein said non-vinylaromatic monomer containing a functional group is (i) acrylonitrile, (ii) at least one acrylate monomer, or (iii) at least one methacrylate monomer, or (iv) a mixture of any two or more of (i) through (iii).

5. A composition as in claim 4 wherein the polymer also includes at least one diene monomer.

6. A composition as in any of claims 1–5 wherein component (b) is at least one polybrominated alpha-omega diphenylalkane having a total of at least 8 bromine atoms directly bonded to the phenyl rings and wherein (1) if such at least one diphenylalkane is a single compound, the alkylene group of the alpha-omega diphenylalkane has in the range of 1 to 4 carbon atoms or (2) if such at least one diphenylalkane is two or more such diphenylalkanes, the alkylene groups of the respective alpha-omega diphenylalkanes have, independently, in the range of 1 to 4 carbon atoms.

7. A composition as in any of claims 1–5 wherein component (b) is at least one polybrominated alpha-omega diphenylalkane having a total of at least 9 bromine atoms directly bonded to the phenyl rings and wherein (1) if such at least one diphenylalkane is a single compound, the alkylene group of the alpha-omega diphenylalkane has in the range of 1 to 2 carbon atoms or (2) if such at least one diphenylalkane is two or more such diphenylalkanes, the alkylene groups of the respective alpha-omega diphenylalkanes have, independently, in the range of 1 to 2 carbon atoms.

8. A composition as in any of claims 1–5 wherein component (b) is decabromodiphenylethane.

9. A composition as in any of claims 1–5 wherein component (a) is brominated anionic styrenic polymer containing at least about 50 wt % of bromine and wherein said composition further comprises at least one antimony oxide or alkali metal antimonate.

10. A composition as in any of claims 1–5 wherein component (a) is brominated anionic styrenic polymer containing at least about 60 wt% of bromine and wherein said composition further comprises at least one antimony oxide or alkali metal antimonate.

11. A composition as in any of claims 1–5 wherein said brominated anionic styrenic polymer contains in the range of about 67 to about 69 wt % of bromine and wherein said composition further comprises at least one antimony oxide or alkali metal antimonate.

12. A flame retardant composition comprising syndiotactic polypropylene or a blend of syndiotactic polypropylene and isotactic polypropylene with which has been blended a flame retardant amount of (a) brominated anionic styrenic polymer, and (b) at least one polybrominated alpha-omega diphenylalkane having a total of at least 6 bromine atoms directly bonded to the phenyl rings and in the range of 1 to 6 carbon atoms in the alkylene group disposed between the phenyl groups, said alkylene group being a linear alkylene group.

13. A composition as in claim 12 wherein (b) is decabromodiphenylethane.

* * * * *